(12) United States Patent
Seregin et al.

(10) Patent No.: US 11,218,694 B2
(45) Date of Patent: Jan. 4, 2022

(54) ADAPTIVE MULTIPLE TRANSFORM CODING

(71) Applicant: QUALCOMM Incorporated, San Diego, CA (US)

(72) Inventors: Vadim Seregin, San Diego, CA (US); Akshay Gadde, Fremont, CA (US); Hilmi Enes Egilmez, San Diego, CA (US); Marta Karczewicz, San Diego, CA (US); Amir Said, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/576,677

(22) Filed: Sep. 19, 2019

(65) Prior Publication Data

US 2020/0099924 A1 Mar. 26, 2020

Related U.S. Application Data

(60) Provisional application No. 62/735,847, filed on Sep. 24, 2018.

(51) Int. Cl.
*H04N 19/61* (2014.01)
*H04N 19/176* (2014.01)
(Continued)

(52) U.S. Cl.
CPC ......... *H04N 19/103* (2014.11); *H04N 19/115* (2014.11); *H04N 19/156* (2014.11); *H04N 19/176* (2014.11); *H04N 19/619* (2014.11)

(58) Field of Classification Search
CPC ... H04N 19/103; H04N 19/115; H04N 19/156
See application file for complete search history.

(56) References Cited

U.S. PATENT DOCUMENTS 9,113,166 B2 * 8/2015 Kim ................. H04N 19/61
9,294,774 B2 * 3/2016 Lee ................. H04N 19/86
(Continued)

FOREIGN PATENT DOCUMENTS

EP 3457691 A1 3/2019
WO 2018101288 A1 6/2018

OTHER PUBLICATIONS

International Search Report and Written Opinion—PCT/US2019/052293—ISA/EPO—dated Sep. 12, 2019.

*Primary Examiner* — Irfan Habib
(74) *Attorney, Agent, or Firm* — Poisinelli LLP

(57) ABSTRACT

Techniques are described for improving transform coding. For example, an encoded block of video data can be obtained, and a width and/or a height of the block can be determined. The width can be compared to a first threshold and/or the height can be compared to a second threshold. A horizontal transform and a vertical transform can be determined for the block based on comparing the width of the block to the first threshold and/or the height of the block to the second threshold. The horizontal transform and the vertical transform are determined without decoding a syntax element that indicates the horizontal transform and the vertical transform (e.g., the syntax element is not in an encoded video bitstream processed by a decoding device). In some cases, residual data is determined using the horizontal and vertical transforms, and a video block is determined using the residual data and a predictive block.

61 Claims, 13 Drawing Sheets

(51) Int. Cl.
　　　*H04N 19/103* (2014.01)
　　　*H04N 19/115* (2014.01)
　　　*H04N 19/156* (2014.01)

(56) References Cited

U.S. PATENT DOCUMENTS

| | | | |
|---|---|---|---|
| 9,438,915 B1 | 9/2016 | Bultje et al. | |
| 9,460,488 B2* | 10/2016 | Jeon | H04N 19/523 |
| 9,787,990 B2* | 10/2017 | Gokhale | H04N 19/124 |
| 9,819,965 B2* | 11/2017 | Puri | H04N 19/122 |
| 10,356,413 B1* | 7/2019 | Sim | H04N 19/186 |
| 10,645,396 B2* | 5/2020 | Zhao | H04N 19/119 |
| 10,687,081 B2* | 6/2020 | Zhao | H04N 19/122 |
| 2006/0018559 A1* | 1/2006 | Kim | H04N 19/157 |
| | | | 382/251 |
| 2009/0238271 A1* | 9/2009 | Kim | H04N 19/122 |
| | | | 375/240.12 |
| 2011/0200113 A1* | 8/2011 | Kim | H04N 19/109 |
| | | | 375/240.16 |
| 2013/0022118 A1* | 1/2013 | Kim | H04N 19/147 |
| | | | 375/240.16 |
| 2016/0119618 A1* | 4/2016 | Tanizawa | H04N 19/159 |
| | | | 375/240.12 |
| 2017/0280162 A1 | 9/2017 | Zhao et al. | |
| 2018/0020218 A1* | 1/2018 | Zhao | H04N 19/176 |
| 2018/0124429 A1* | 5/2018 | Lee | H04N 19/593 |
| 2018/0332289 A1 | 11/2018 | Huang | |
| 2019/0222843 A1* | 7/2019 | Lee | H04N 19/198 |
| 2019/0281298 A1* | 9/2019 | Ohkawa | H04N 19/159 |
| 2020/0260070 A1* | 8/2020 | Yoo | H04N 19/103 |
| 2020/0288121 A1* | 9/2020 | Zhao | H04N 19/12 |
| 2020/0288130 A1* | 9/2020 | Seregin | H04N 19/146 |
| 2020/0314426 A1 | 10/2020 | Salehifar et al. | |

* cited by examiner

4x4 DST-VII:

4-point DCT-II:

8-point DCT-II:

16-point DCT-II:

```
32-point DCT-II:
{64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64}
{90, 90, 88, 85, 82, 78, 73, 67, 61, 54, 46, 38, 31, 22, 13, 4, -4, -13, -22, -31, -38, -46, -54, -61, -67, -73, -78, -82, -85, -88, -90, -90}
{90, 87, 80, 70, 57, 43, 25, 9, -9, -25, -43, -57, -70, -80, -87, -90, -90, -87, -80, -70, -57, -43, -25, -9, 9, 25, 43, 57, 70, 80, 87, 90}
{90, 82, 67, 46, 22, -4, -31, -54, -73, -85, -90, -88, -78, -61, -38, -13, 13, 38, 61, 78, 88, 90, 85, 73, 54, 31, 4, -22, -46, -67, -82, -90}
{89, 75, 50, 18, -18, -50, -75, -89, -89, -75, -50, -18, 18, 50, 75, 89, 89, 75, 50, 18, -18, -50, -75, -89, -89, -75, -50, -18, 18, 50, 75, 89}
{88, 67, 31, -13, -54, -82, -90, -78, -46, -4, 38, 73, 90, 85, 61, 22, -22, -61, -85, -90, -73, -38, 4, 46, 78, 90, 82, 54, 13, -31, -67, -88}
{87, 57, 9, -43, -80, -90, -70, -25, 25, 70, 90, 80, 43, -9, -57, -87, -87, -57, -9, 43, 80, 90, 70, 25, -25, -70, -90, -80, -43, 9, 57, 87}
{85, 46, -13, -67, -90, -73, -22, 38, 82, 88, 54, -4, -61, -90, -78, -31, 31, 78, 90, 61, 4, -54, -88, -82, -38, 22, 73, 90, 67, 13, -46, -85}
{83, 36, -36, -83, -83, -36, 36, 83, 83, 36, -36, -83, -83, -36, 36, 83, 83, 36, -36, -83, -83, -36, 36, 83, 83, 36, -36, -83, -83, -36, 36, 83}
{82, 22, -54, -90, -61, 13, 78, 85, 31, -46, -90, -67, 4, 73, 88, 38, -38, -88, -73, -4, 67, 90, 46, -31, -85, -78, -13, 61, 90, 54, -22, -82}
{80, 9, -70, -87, -25, 57, 90, 43, -43, -90, -57, 25, 87, 70, -9, -80, -80, -9, 70, 87, 25, -57, -90, -43, 43, 90, 57, -25, -87, -70, 9, 80}
{78, -4, -82, -73, 13, 85, 67, -22, -88, -61, 31, 90, 54, -38, -90, -46, 46, 90, 38, -54, -90, -31, 61, 88, 22, -67, -85, -13, 73, 82, 4, -78}
{75, -18, -89, -50, 50, 89, 18, -75, -75, 18, 89, 50, -50, -89, -18, 75, 75, -18, -89, -50, 50, 89, 18, -75, -75, 18, 89, 50, -50, -89, -18, 75}
{73, -31, -90, -22, 78, 67, -38, -90, -13, 82, 61, -46, -88, -4, 85, 54, -54, -85, 4, 88, 46, -61, -82, 13, 90, 38, -67, -78, 22, 90, 31, -73}
{70, -43, -87, 9, 90, 25, -80, -57, 57, 80, -25, -90, -9, 87, 43, -70, -70, 43, 87, -9, -90, -25, 80, 57, -57, -80, 25, 90, 9, -87, -43, 70}
{67, -54, -78, 38, 85, -22, -90, 4, 90, 13, -88, -31, 82, 46, -73, -61, 61, 73, -46, -82, 31, 88, -13, -90, -4, 90, 22, -85, -38, 78, 54, -67}
{64, -64, -64, 64, 64, -64, -64, 64, 64, -64, -64, 64, 64, -64, -64, 64, 64, -64, -64, 64, 64, -64, -64, 64, 64, -64, -64, 64, 64, -64, -64, 64}
{61, -73, -46, 82, 31, -88, -13, 90, -4, -90, 22, 85, -38, -78, 54, 67, -67, -54, 78, 38, -85, -22, 90, 4, -90, 13, 88, -31, -82, 46, 73, -61}
{57, -80, -25, 90, -9, -87, 43, 70, -70, -43, 87, 9, -90, 25, 80, -57, -57, 80, 25, -90, 9, 87, -43, -70, 70, 43, -87, -9, 90, -25, -80, 57}
{54, -85, -4, 88, -46, -61, 82, 13, -90, 38, 67, -78, -22, 90, -31, -73, 73, 31, -90, 22, 78, -67, -38, 90, -13, -82, 61, 46, -88, 4, 85, -54}
{50, -89, 18, 75, -75, -18, 89, -50, -50, 89, -18, -75, 75, 18, -89, 50, 50, -89, 18, 75, -75, -18, 89, -50, -50, 89, -18, -75, 75, 18, -89, 50}
{46, -90, 38, 54, -90, 31, 61, -88, 22, 67, -85, 13, 73, -82, 4, 78, -78, -4, 82, -73, -13, 85, -67, -22, 88, -61, -31, 90, -54, -38, 90, -46}
{43, -90, 57, 25, -87, 70, 9, -80, 80, -9, -70, 87, -25, -57, 90, -43, -43, 90, -57, -25, 87, -70, -9, 80, -80, 9, 70, -87, 25, 57, -90, 43}
{38, -88, 73, -4, -67, 90, -46, -31, 85, -78, 13, 61, -90, 54, 22, -82, 82, -22, -54, 90, -61, -13, 78, -85, 31, 46, -90, 67, 4, -73, 88, -38}
{36, -83, 83, -36, -36, 83, -83, 36, 36, -83, 83, -36, -36, 83, -83, 36, 36, -83, 83, -36, -36, 83, -83, 36, 36, -83, 83, -36, -36, 83, -83, 36}
{31, -78, 90, -61, 4, 54, -88, 82, -38, -22, 73, -90, 67, -13, -46, 85, -85, 46, 13, -67, 90, -73, 22, 38, -82, 88, -54, -4, 61, -90, 78, -31}
{25, -70, 90, -80, 43, 9, -57, 87, -87, 57, -9, -43, 80, -90, 70, -25, -25, 70, -90, 80, -43, -9, 57, -87, 87, -57, 9, 43, -80, 90, -70, 25}
{22, -61, 85, -90, 73, -38, -4, 46, -78, 90, -82, 54, -13, -31, 67, -88, 88, -67, 31, 13, -54, 82, -90, 78, -46, 4, 38, -73, 90, -85, 61, -22}
{18, -50, 75, -89, 89, -75, 50, -18, -18, 50, -75, 89, -89, 75, -50, 18, 18, -50, 75, -89, 89, -75, 50, -18, -18, 50, -75, 89, -89, 75, -50, 18}
{13, -38, 61, -78, 88, -90, 85, -73, 54, -31, 4, 22, -46, 67, -82, 90, -90, 82, -67, 46, -22, -4, 31, -54, 73, -85, 90, -88, 78, -61, 38, -13}
{9, -25, 43, -57, 70, -80, 87, -90, 90, -87, 80, -70, 57, -43, 25, -9, -9, 25, -43, 57, -70, 80, -87, 90, -90, 87, -80, 70, -57, 43, -25, 9}
{4, -13, 22, -31, 38, -46, 54, -61, 67, -73, 78, -82, 85, -88, 90, -90, 90, -90, 88, -85, 82, -78, 73, -67, 61, -54, 46, -38, 31, -22, 13, -4}
```

FIG. 2E

ADAPTIVE MULTIPLE TRANSFORM CODING

CROSS-REFERENCE TO RELATED APPLICATIONS

This application claims the benefit of U.S. Provisional Application No. 62/735,847, filed Sep. 24, 2018, which is hereby incorporated by reference, in its entirety and for all purposes.

FIELD

This application is related to video coding and compression. For example, systems and methods are described for improving transform coding, such as adaptive multiple transform coding.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), MPEG-2 Part 2 coding (MPEG stands for moving picture experts group), VP9, Alliance of Open Media (AOMedia) Video 1 (AV1), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Techniques and systems are described herein for improving performance of residual transform coding. In general, a video encoder and/or video decoder can perform spatial (intra-picture) prediction and/or temporal (inter-picture) prediction to reduce or remove redundancy inherent in video sequences. An inter-coded block is encoded according to at least one motion vector that points to at least one block of reference samples forming a predictive block. The at least one block of reference samples is from one or more reference pictures. The residual data of an inter-coded block indicates the difference between the coded block and the predictive block from the one or more reference pictures. An intra-coded block is encoded based on an intra-coding mode corresponding to a prediction direction. The residual data of an intra-coded block indicates the difference between the coded block and the predictive block within the same picture as the coded block.

The residual data from an inter-coded and/or an intra-coded block can be divided into one or more transform units and/or transform blocks of samples. For further compression, the residual data can be transformed from the pixel domain to a transform domain, resulting in residual coefficients. The residual coefficients can then be quantized. Transforms that can be used include discrete sine transforms (DSTs) and discrete cosine transforms (DCTs). Transform kernels corresponding to the transforms can be applied on one-dimensional (1D) input data, and in some cases can be extended for two-dimensional (2D) input data sources.

In some video codecs, such as H.264/AVC, a default transform (a DCT Type-II transform) is always applied for residuals based on both intra prediction and inter prediction. Adaptive multiple transform (AMT) (also referred to as enhanced multiple transform or EMT) is a coding scheme in which different transforms can be chosen by the encoder for each block of prediction residuals. The chosen transform is signaled as side information (e.g., using a transform index, a flag, or other signaling mechanism). In some AMT designs, various AMT transform options are provided to the video encoder for selection on a per-block basis (e.g., based on a rate-distortion metric). An index for the selected transform can then be signaled by the video encoder in a video bitstream, which can be decoded and analyzed by the video decoder. In the Versatile Video Coding (VVC) reference software, the AMT transforms are implemented using matrix multiplication, and AMT usage is restricted to blocks with certain widths and heights (e.g., width<=32 and height<=32). In such cases, the maximum size of the AMT matrices used is restricted to 32×32 (corresponding to width x height). This restriction is set to limit memory and computational complexity requirements. For example, allowing usage of AMT in blocks with width or height larger than 32 may provide additional coding gain, but can lead to increased memory and computational complexity.

The techniques and systems described herein can improve performance of AMT and other transform schemes. In some examples, an AMT flag can be explicitly signaled indicating whether AMT is used for a block (e.g., a coding unit or other block). According to some examples provided herein, the signaling of the AMT flag can be restricted based on a size of a block (e.g., a coding unit, prediction unit, or transform unit). For instance, a value of an AMT flag for a block can be restricted to a value (e.g., a 0 or 1) indicating to a decoder that AMT is not used for that block, without signaling the AMT flag in the bitstream, if the width and height of the block satisfy one of various conditions. The conditions can be based on a size of the block, such as the width and/or height of the block. In one example, an AMT flag with a value of 0 for a block indicates to a decoder that AMT is not used for that block, and thus that a default transform is to be used for the residual data (e.g., one or more transform units and/or transform blocks) corresponding to that block. In some cases, the default transform can include a DCT Type-II transform. In such an example, an AMT flag with a value of 1 for a block indicates to the decoder that AMT can be used for that block, and thus that an AMT transform other than the default transform can be used.

Techniques are also described for improving AMT performance when implicit signaling is used. For example, when implicit signaling is used, there is no signaling of an AMT flag in the encoded video bitstream for a block; rather, the transform to apply for the block is implicitly derived by the decoder (e.g., based on block size, coding mode, and/or other information). According to some examples provided herein, the horizontal and/or vertical transform can be restricted for residual data based on a width and/or height of a block including the residual data or based on a width and/or height of a block of the residual data (e.g., a coding unit, prediction unit, or transform unit generated for the block). In one example, without signaling (e.g., in the video bitstream) any indication of which horizontal transform to use for a block of residual data (e.g., a transform unit and/or transform block), a horizontal transform kernel for the block of residual data is restricted (or fixed) to be a transform other than a default transform (e.g., an AMT transform, such as a DST Type-VII transform) if the width of the block of residual data is less than a threshold width. In such an example, again without signaling any indication of which horizontal transform to use for a block of residual data, if the width of the block of residual data is greater than the threshold width, the horizontal transform kernel is restricted (or fixed) to be the default transform (e.g., a DCT Type-II transform). Similar restrictions can be defined to indicate a vertical transform to use for the block of residual data based on the height of the block of residual data. Using such fixed transforms based on the width and/or height of the block of residual data, a decoder can determine the transforms to use for the block without needing the overhead of signaling information in the bitstream.

Other techniques are also provided herein for improving transform coding.

According to at least one example, a method of decoding video data is provided. The method includes obtaining an encoded block of the video data, and determining at least one of a width of the block and a height of the block. The method further comprises comparing at least one of the width of the block to a first threshold and the height of the block to a second threshold. The method further comprises determining a horizontal transform and a vertical transform to use for the block based on comparing at least one of the width of the block to the first threshold and the height of the block to the second threshold. The horizontal transform and the vertical transform are determined without decoding a syntax element that indicates the horizontal transform and the vertical transform. The method further comprises determining a block of residual data based on the horizontal transform and the vertical transform determined for the block. The method further comprises decoding, using intra-prediction or inter-prediction, a video block based on the block of residual data and a predictive block.

In another example, an apparatus for decoding video data is provided that includes a memory configured to store at least one encoded block of the video data, and a video decoder comprising at least one of fixed-function and programmable circuitry. In some examples, the video decoder is configured to obtain an encoded block of the video data, and is configured to determine at least one of a width of the block and a height of the block. The video decoder is further configured to compare at least one of the width of the block to a first threshold and the height of the block to a second threshold. The video decoder is further configured to determine a horizontal transform and a vertical transform to use for the block based on a comparison of at least one of the width of the block to the first threshold and the height of the block to the second threshold. The horizontal transform and the vertical transform are determined without decoding a syntax element that indicates the horizontal transform and the vertical transform. The video decoder is further configured to determine a block of residual data based on the horizontal transform and the vertical transform determined for the block. The video decoder is further configured to decode, using intra-prediction or inter-prediction, a video block based on the block of residual data and a predictive block.

In another example, a computer-readable storage medium storing instructions that when executed cause one or more processors of a device for decoding video data to: obtain an encoded block of the video data; determine at least one of a width of the block and a height of the block; compare at least one of the width of the block to a first threshold and the height of the block to a second threshold; determine a horizontal transform and a vertical transform to use for the block based on comparing at least one of the width of the block to the first threshold and the height of the block to the second threshold, the horizontal transform and the vertical transform being determined without decoding a syntax element that indicates the horizontal transform and the vertical transform; determine a block of residual data based on the horizontal transform and the vertical transform determined for the block; and decode, using intra-prediction or inter-prediction, a video block based on the block of residual data and a predictive block.

In another example, an apparatus for decoding video data is provided. The apparatus includes means for obtaining an encoded block of the video data, and means for determining at least one of a width of the block and a height of the block. The apparatus further includes means for comparing at least one of the width of the block to a first threshold and the height of the block to a second threshold. The apparatus further includes means for determining a horizontal transform and a vertical transform to use for the block based on a comparison of at least one of the width of the block to the first threshold and the height of the block to the second threshold. The horizontal transform and the vertical transform are determined without decoding a syntax element that indicates the horizontal transform and the vertical transform. The apparatus further includes means for determining a block of residual data based on the horizontal transform and the vertical transform determined for the block. The apparatus further includes means for decoding, using intra-prediction or inter-prediction, a video block based on the block of residual data and a predictive block.

In some aspects, the horizontal transform is determined for the block based on comparing the width of the block to the first threshold. In some aspects, the vertical transform is determined for the block based on comparing the height of the block to the second threshold.

In some aspects, the horizontal transform is determined for the block based on comparing the width of the block to the first threshold, and wherein the vertical transform is determined for the block based on comparing the height of the block to the second threshold.

In some aspects, the horizontal transform is restricted for a transform unit (TU) of the block based on the width of the block.

In some aspects, the vertical transform is restricted for a transform unit (TU) of the block based on the height of the block.

In some aspects, the horizontal transform for the block is determined to be a first type of horizontal transform when the width of the block is less than the first threshold. In some aspects, the horizontal transform for the block is determined to be a second type of horizontal transform when the width of the block is greater than the first threshold. In some aspects, the first type of horizontal transform is different than the second type of horizontal transform. In some aspects, the second type of horizontal transform is a discrete cosine transform (DCT) Type-II transform, and the first type of horizontal transform is a transform that is different than a DCT Type-II transform. In some aspects, the first type of horizontal transform is one of a discrete sine transform (DST) Type-VII transform or a DCT Type-VIII transform.

In some aspects, the vertical transform for the block is determined to be a first type of vertical transform when the height of the block is less than the second threshold. In some aspects, the vertical transform for the block is determined to be a second type of vertical transform when the height of the block is greater than the second threshold. In some aspects, the first type of vertical transform is different than the second type of vertical transform. In some aspects, the second type of vertical transform is a discrete cosine transform (DCT) Type-II transform, and wherein the first type of vertical transform is a transform that is different than a DCT Type-II transform. In some aspects, the first type of vertical transform is one of a discrete sine transform (DST) Type-VII transform or a DCT Type-VIII transform.

In some aspects, the block includes a coding unit (CU) or a transform unit (TU).

According to at least one other example, a method of encoding video data is provided. The method includes obtaining a block of video data, and determining at least one of a width of the block and a height of the block. The method further comprises comparing at least one of the width of the block to a first threshold and the height of the block to a second threshold. The method further comprises determining a horizontal transform and a vertical transform to use for the block based on comparing at least one of the width of the block to the first threshold and the height of the block to the second threshold. The method further comprises generating, without a syntax element that indicates the horizontal transform and the vertical transform, an encoded video bitstream.

In another example, an apparatus for encoding video data is provided that includes a memory configured to store at least one block of the video data, and a video encoder comprising at least one of fixed-function and programmable circuitry. In some examples, the video encoder is configured to obtain a block of video data, and is configured to determine at least one of a width of the block and a height of the block. The video encoder is further configured to compare at least one of the width of the block to a first threshold and the height of the block to a second threshold. The video encoder is further configured to determine a horizontal transform and a vertical transform to use for the block based on a comparison of at least one of the width of the block to the first threshold and the height of the block to the second threshold. The video encoder is further configured to generate, without a syntax element that indicates the horizontal transform and the vertical transform, an encoded video bitstream.

In another example, a computer-readable storage medium storing instructions that when executed cause one or more processors of a device for encoding video data to: obtain a block of video data; determine at least one of a width of the block and a height of the block; compare at least one of the width of the block to a first threshold and the height of the block to a second threshold; determine a horizontal transform and a vertical transform to use for the block based on comparing at least one of the width of the block to the first threshold and the height of the block to the second threshold; and generate, without a syntax element that indicates the horizontal transform and the vertical transform, an encoded video bitstream.

In another example, an apparatus for decoding video data is provided. The apparatus includes means for obtaining a block of video data, and means for determining at least one of a width of the block and a height of the block. The apparatus further includes means for comparing at least one of the width of the block to a first threshold and the height of the block to a second threshold. The apparatus further includes means for determining a horizontal transform and a vertical transform to use for the block based on comparing at least one of the width of the block to the first threshold and the height of the block to the second threshold. The apparatus further includes means for generating, without a syntax element that indicates the horizontal transform and the vertical transform, an encoded video bitstream.

In some aspects, the horizontal transform is determined for the block based on comparing the width of the block to the first threshold. In some aspects, the vertical transform is determined for the block based on comparing the height of the block to the second threshold.

In some aspects, the horizontal transform is determined for the block based on comparing the width of the block to the first threshold, and the vertical transform is determined for the block based on comparing the height of the block to the second threshold.

In some aspects, the horizontal transform is restricted for a transform unit (TU) of the block based on the width of the block.

In some aspects, the vertical transform is restricted for a transform unit (TU) of the block based on the height of the block.

In some aspects, the horizontal transform for the block is determined to be a first type of horizontal transform when the width of the block is less than the first threshold. In some aspects, the horizontal transform for the block is determined to be a second type of horizontal transform when the width of the block is greater than the first threshold. In some aspects, the first type of horizontal transform is different than the second type of horizontal transform. In some aspects, the second type of horizontal transform is a discrete cosine transform (DCT) Type-II transform, and the first type of horizontal transform is a transform that is different than a DCT Type-II transform. In some aspects, the first type of horizontal transform is one of a discrete sine transform (DST) Type-VII transform or a DCT Type-VIII transform.

In some aspects, the vertical transform for the block is determined to be a first type of vertical transform when the height of the block is less than the second threshold. In some aspects, the vertical transform for the block is determined to be a second type of vertical transform when the height of the block is greater than the second threshold. In some aspects, the first type of vertical transform is different than the second type of vertical transform. In some aspects, the second type of vertical transform is a discrete cosine transform (DCT) Type-II transform, and wherein the first type of vertical transform is a transform that is different than a DCT Type-II transform. In some aspects, the first type of vertical transform is one of a discrete sine transform (DST) Type-VII transform or a DCT Type-VIII transform.

In some aspects, the block includes a coding unit (CU) or a transform unit (TU).

In some aspects, the methods, apparatuses, and computer-readable media described above can comprise: generating a transform block including one or more transform coefficients based on application of the horizontal transform and the vertical transform to residual data; and encoding the transform block.

According to at least one other example, a method of decoding video data is provided. The method includes obtaining an encoded block of the video data, and determining at least one of a width of the block and a height of the block. The method further comprises comparing at least one of the width of the block to a first threshold and the height of the block to a second threshold. The method further comprises: where it is determined that the width of the block exceeds the first threshold, determining a horizontal transform corresponding to a first default horizontal transform; where it is determined that the width of the block does not exceed the first threshold, determining a horizontal transform corresponding to a second default horizontal transform; where it is determined that the height of the block exceeds the second threshold, determining a vertical transform corresponding to a first default vertical transform; and/or where it is determined that the height of the block does not exceed the second threshold, determining a vertical transform corresponding to a second default vertical transform. The method further comprises determining a block of residual data based on the horizontal transform and the vertical transform determined for the block. The method further comprises decoding, using intra-prediction or inter-prediction, a video block based on the block of residual data and a predictive block.

In another example, an apparatus for decoding video data is provided that includes a memory configured to store at least one block of the video data, and a video decoder comprising at least one of fixed-function and programmable circuitry. In some examples, the video encoder is configured to obtain an encoded block of the video data, and is configured to determine at least one of a width of the block and a height of the block. The video encoder is further configured to compare at least one of the width of the block to a first threshold and the height of the block to a second threshold. The video encoder is further configured to: where it is determined that the width of the block exceeds the first threshold, determine a horizontal transform corresponding to a first default horizontal transform; where it is determined that the width of the block does not exceed the first threshold, determine a horizontal transform corresponding to a second default horizontal transform; where it is determined that the height of the block exceeds the second threshold, determine a vertical transform corresponding to a first default vertical transform; and/or where it is determined that the height of the block does not exceed the second threshold, determine a vertical transform corresponding to a second default vertical transform. The video encoder is configured to determine a block of residual data based on the horizontal transform and the vertical transform determined for the block. The video encoder is configured to decode, using intra-prediction or inter-prediction, a video block based on the block of residual data and a predictive block.

In another example, a computer-readable storage medium storing instructions that when executed cause one or more processors of a device for decoding video data to: obtain an encoded block of the video data; determine at least one of a width of the block and a height of the block; compare at least one of the width of the block to a first threshold and the height of the block to a second threshold; where it is determined that the width of the block exceeds the first threshold, determine a horizontal transform corresponding to a first default horizontal transform; where it is determined that the width of the block does not exceed the first threshold, determine a horizontal transform corresponding to a second default horizontal transform; where it is determined that the height of the block exceeds the second threshold, determine a vertical transform corresponding to a first default vertical transform; where it is determined that the height of the block does not exceed the second threshold, determine a vertical transform corresponding to a second default vertical transform; determine a block of residual data based on the horizontal transform and the vertical transform determined for the block; and decode, using intra-prediction or inter-prediction, a video block based on the block of residual data and a predictive block.

In another example, an apparatus for decoding video data is provided. The apparatus includes means for obtaining an encoded block of the video data, and means for determining at least one of a width of the block and a height of the block. The apparatus further includes means for comparing at least one of the width of the block to a first threshold and the height of the block to a second threshold. The apparatus further includes: means for determining a horizontal transform corresponding to a first default horizontal transform when it is determined that the width of the block exceeds the first threshold; means for determining a horizontal transform corresponding to a second default horizontal transform when it is determined that the width of the block does not exceed the first threshold; means for determining a vertical transform corresponding to a first default vertical transform when it is determined that the height of the block exceeds the second threshold; and/or means for determining a vertical transform corresponding to a second default vertical transform when it is determined that the height of the block does not exceed the second threshold. The apparatus further includes means for determining a block of residual data based on the horizontal transform and the vertical transform determined for the block. The apparatus further includes means for decoding, using intra-prediction or inter-prediction, a video block based on the block of residual data and a predictive block.

According to at least one other example, a method of encoding video data is provided. The method includes obtaining a block of video data, and determining at least one of a width of the block and a height of the block. The method further comprises comparing at least one of the width of the block to a first threshold and the height of the block to a second threshold. The method further comprises: where it is determined that the width of the block exceeds the first threshold, determining a horizontal transform corresponding to a first default horizontal transform; where it is determined that the width of the block does not exceed the first threshold, determining a horizontal transform corresponding to a second default horizontal transform; where it is determined that the height of the block exceeds the second threshold, determining a vertical transform corresponding to a first default vertical transform; and/or where it is determined that the height of the block does not exceed the second threshold, determining a vertical transform corresponding to a second default vertical transform. The method further comprises generating, without a syntax element that indicates the determined horizontal transform and the determined vertical transform, an encoded video bitstream.

In another example, an apparatus for encoding video data is provided that includes a memory configured to store at least one block of the video data, and a video encoder comprising at least one of fixed-function and programmable circuitry. In some examples, the video encoder is configured to obtain a block of video data, and is configured to determine at least one of a width of the block and a height of the block. The video encoder is further configured to compare at least one of the width of the block to a first threshold and the height of the block to a second threshold. The video encoder is further configured to: where it is determined that the width of the block exceeds the first threshold, determine a horizontal transform corresponding to a first default horizontal transform; where it is determined that the width of the block does not exceed the first threshold, determine a horizontal transform corresponding to a second default horizontal transform; where it is determined that the height of the block exceeds the second threshold, determine a vertical transform corresponding to a first default vertical transform; and/or where it is determined that the height of the block does not exceed the second threshold, determine a vertical transform corresponding to a second default vertical transform. The video encoder is further configured to generate, without a syntax element that indicates the determined horizontal transform and the determined vertical transform, an encoded video bitstream.

In another example, a computer-readable storage medium storing instructions that when executed cause one or more processors of a device for encoding video data to: obtain a block of video data; determine at least one of a width of the block and a height of the block; compare at least one of the width of the block to a first threshold and the height of the block to a second threshold; where it is determined that the width of the block exceeds the first threshold, determine a horizontal transform corresponding to a first default horizontal transform; where it is determined that the width of the block does not exceed the first threshold, determine a horizontal transform corresponding to a second default horizontal transform; where it is determined that the height of the block exceeds the second threshold, determine a vertical transform corresponding to a first default vertical transform; where it is determined that the height of the block does not exceed the second threshold, determine a vertical transform corresponding to a second default vertical transform; and generate, without a syntax element that indicates the determined horizontal transform and the determined vertical transform, an encoded video bitstream.

In another example, an apparatus for encoding video data is provided. The apparatus includes means for obtaining a block of video data, and means for determining at least one of a width of the block and a height of the block. The apparatus further includes means for comparing at least one of the width of the block to a first threshold and the height of the block to a second threshold. The apparatus further includes: means for determining a horizontal transform corresponding to a first default horizontal transform when it is determined that the width of the block exceeds the first threshold; means for determining a horizontal transform corresponding to a second default horizontal transform when it is determined that the width of the block does not exceed the first threshold; means for determining a vertical transform corresponding to a first default vertical transform when it is determined that the height of the block exceeds the second threshold; and/or means for determining a vertical transform corresponding to a second default vertical transform when it is determined that the height of the block does not exceed the second threshold. The apparatus further includes means for generating, without a syntax element that indicates the determined horizontal transform and the determined vertical transform, an encoded video bitstream.

The above-described aspects relating to any of the methods, apparatuses, and computer-readable media can be used individually or in any suitable combination.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures:

FIG. 2A-FIG. 2E are tables illustrating examples of transform types, in accordance with some examples;

DETAILED DESCRIPTION

Figure 1:
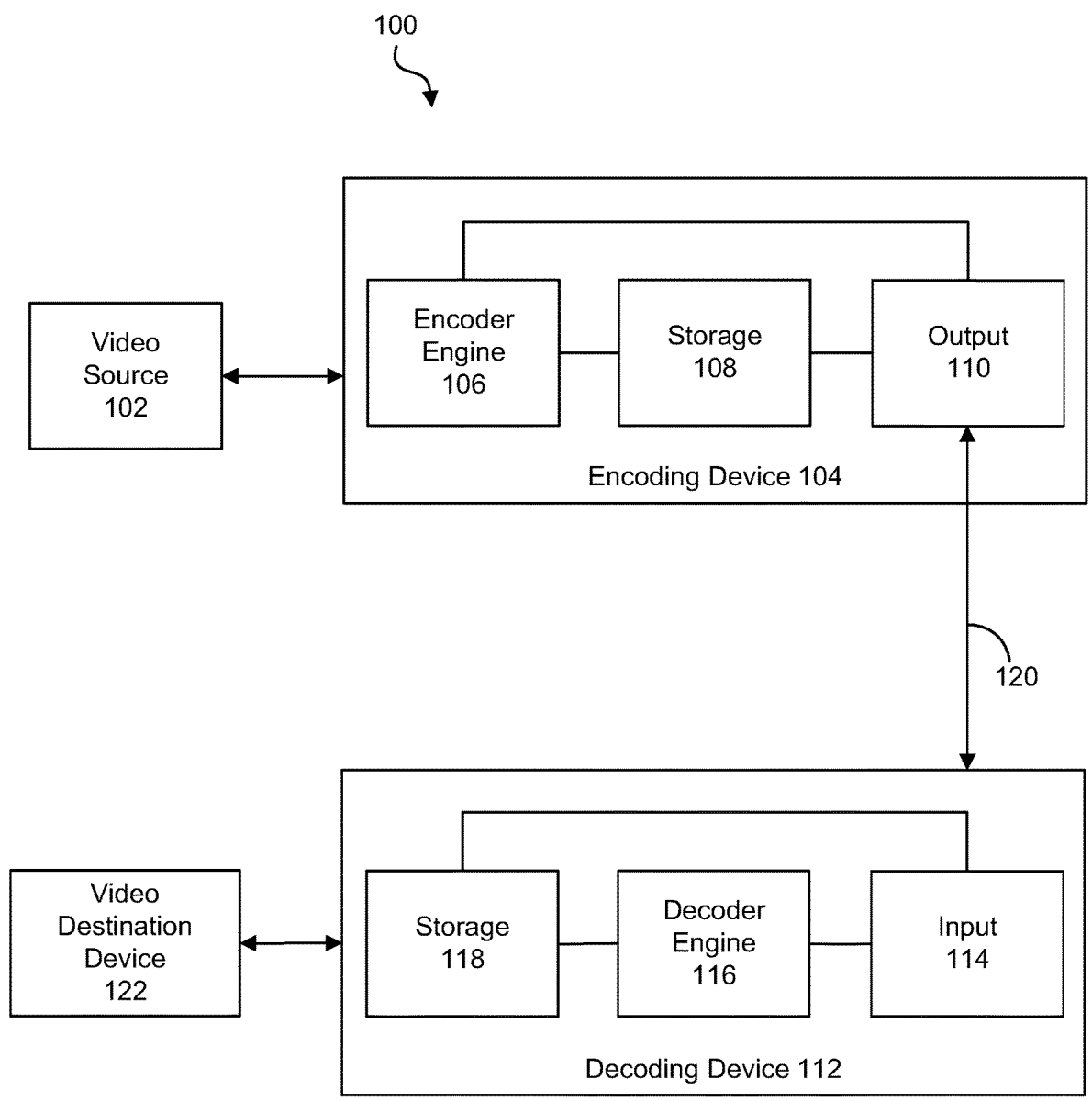
FIG. 1 is a block diagram illustrating an example of a system including an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction error can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As described in more detail below, systems, apparatuses, methods (also referred to as processes), and computer-readable media are described herein that are related to improving performance of residual transform coding, which is a fundamental element of modern video compression standards. In some examples, techniques are described for improving an adaptive transform coding scheme, such as adaptive multiple transform (AMT) coding. For instance, techniques are described that impose restrictions on adaptive transforms that can be used for a block based on information related to that block, such as a shape and/or size of the block and/or information from one or more blocks that neighbor the block (referred to as neighboring blocks). Imposing the restrictions noted above can introduce additional coding gains.

The techniques described herein lead to adaptive transform coding (e.g., AMT) designs that require less signaling overhead as compared to other AMT designs. Because the adaptive transform coding techniques described herein have less signaling overhead, the designs can improve coding gains and may be used in the context of advanced video codecs. For example, the techniques described herein can be applied to one or more of a variety of block based video coding techniques in which video is reconstructed on block-by-block basis. The blocks of pixels may variously be referred to as coding tree units (CTUs), largest coding units (LCU), prediction unit (PU), transform unit (TU), and/or other terminology depending upon the block based video coding used, as described herein. In some examples, the techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), VP9, AV1, and/or other video coding standard in development or to be developed.

FIG. 1 is a block diagram illustrating an example of a system 100 including an encoding device 104 and a decoding device 112. The encoding device 104 may be part of a source device, and the decoding device 112 may be part of a receiving device (also referred to as a client device). The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9 and Alliance of Open Media (AOMedia) Video 1 (AV1) are other video coding standards for which the techniques described herein can be applied.

Many embodiments described herein can be performed using video codecs such as VTM, VVC, HEVC, AVC, and/or extensions thereof. However, the techniques and systems described herein may also be applicable to other coding standards, such as MPEG, Joint Photographic Experts Group (JPEG) (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a Random Access Skipped Leading (RASL) picture flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $\Delta y_0$, $refIdx_0$ and $\Delta x_1$, $\Delta y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $\Delta y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 106 may form one or more TUs including the residual data for a CU (which includes the PUs), and may then transform the TUs to produce transform coefficients for the CU. The TUs may comprise coefficients in the transform domain following application of a block transform.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, an inter-coded block is encoded according to at least one motion vector that points to at least one block of reference samples forming a predictive block. The residual data of an inter-coded block indicates the difference between the coded block and the predictive block. An intra-coded block is encoded based on an intra-coding mode corresponding to a prediction direction. The residual data of an intra-coded block indicates the difference between the coded block and the predictive block within the same picture as the coded block. For further compression, the residual data from an inter- or intra-coded block (which can be included in one or more transform units (TU) of samples containing transform blocks (TBs)) can be transformed from the pixel domain to a transform domain, resulting in residual coefficients, which then may be quantized.

Transforms that can be used include discrete sine transforms (DSTs) and discrete cosine transforms (DCTs). Transform kernels corresponding to the transforms can be applied on one-dimensional (1D) input data, and in some cases can be extended for two-dimensional (2D) input data sources. An overview of the DCT and DST transforms, as well as the transform scheme used in the HEVC standard, will now be described. With respect to DCT and DST transforms, the term transform indicates the process of deriving an alternative representation of an input signal (e.g., a video signal). For example, given an N-point vector $x=[x_0, x_1, \ldots, x_{N-1}]^T$ and a set of given transform basis vectors $\{\Phi_0, \Phi_1, \ldots, \Phi_{M-1}\}$, x can be approximated or exactly represented using a linear combination of $\Phi_0, \Phi_1, \ldots, \Phi_{M-1}$, which can be formulated as follows:

$$\hat{x} = \sum_{i=0}^{M-1} f_i \cdot \Phi_i$$

where $\hat{x}$ can be an approximation or equivalent of x, $f_i=[f_1, f_2, \ldots, f_{M-1}]$ are the transform coefficient vectors, and $\Phi_i=\{\Phi_0, \Phi_1, \ldots, \Phi_{M-1}\}$ are the transform basis vectors.

In the scenario of video coding, transform coefficients are roughly non-correlated and sparse, e.g., the energy of the input vector x is compacted only on a few transform coefficients, and the remaining (e.g., the majority) transform coefficients are typically close to 0.

Given the specific input data, an optimal transform in terms of energy compaction is the so-called Karhunen-Loeve transform (KLT), which uses the eigen vectors of the covariance matrix of the input data as the transform basis vectors. Therefore, KLT is actually a data-dependent transform and does not have a general mathematical formulation. However, under certain assumptions (e.g., the input data forms a first-order stationary Markov processes), it has been proven in the literature that the corresponding KLT is actually a member of the sinusoidal family of unitary transforms, which is described in Jain, A. K., A sinusoidal family of unitary transforms, IEEE Trans. on Pattern Analysis and Machine Intelligence, 1, 356, 1979. The sinusoidal family of unitary transforms indicates transforms using transform basis vectors formulated as follows:

$$\Phi_m(k) = A \cdot e^{ik\theta} + B \cdot e^{-ik\theta}$$

where e is the base of the natural logarithm approximately equal to 2.71828, A, B, and $\theta$ are complex in general, and depend on the value of m.

Several well-known transforms including the discrete Fourier, cosine, sine, and the KLT (for first-order stationary Markov processes) are members of this sinusoidal family of unitary transforms. According to S. A. Martucci, "Symmetric convolution and the discrete sine and cosine transforms," IEEE Trans. Sig. Processing SP-42, 1038-1051 (1994), the complete set of DCT and DST families include 16 transforms based on different types, i.e., different values of A, B, and $\theta$, and a complete definition of the different types of DCT and DST are given below.

In one illustrative example, assuming the input N-point vector is denoted as $x=[x_0, x_1, \ldots, x_{N-1}]^T$, the N-point vector is transformed to another N-point transform coefficient vector denoted as $y=[y_0, y_1, \ldots, y_{N-1}]^T$ by multiplying a matrix, the process of which can be further illustrated according to one of the following transform formulations, wherein k ranges from 0 through N−1, inclusive:

DCT Type-I (DCT-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

where $$w_0 = \begin{cases} \frac{1}{\sqrt{2}}, & \text{if } n = 0 \text{ or } n = N-1 \\ 1, & \text{otherwise} \end{cases},$$

$$w_1 = \begin{cases} \frac{1}{\sqrt{2}}, & \text{if } k = 0 \text{ or } k = N-1 \\ 1, & \text{otherwise} \end{cases}$$

DCT Type-II (DCT-2):

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

where $$w_0 = \begin{cases} \frac{1}{\sqrt{2}}, & \text{if } k = 0 \\ 1, & \text{otherwise} \end{cases}$$

DCT Type-III (DCT-3):

$$y_k = \sum_{n=0}^{N-1} \sqrt{\frac{2}{N}} \cos\left(\frac{\pi \cdot n \cdot (k+0.5)}{N}\right) \cdot w_0 \cdot x_n,$$

where $$w_0 = \begin{cases} \frac{1}{\sqrt{2}}, & \text{if } n = 0 \\ 1, & \text{otherwise} \end{cases}$$

DCT Type-IV (DCT-4):

$$y_k = \sum_{n=0}^{N-1} \sqrt{\frac{2}{N}} \cos\left(\frac{\pi \cdot (n+0.5) \cdot (k+0.5)}{N-1}\right) \cdot x_n,$$

DCT Type-V (DCT-5):

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $$w_0 = \begin{cases} \frac{1}{\sqrt{2}}, & \text{if } n = 0 \\ 1, & \text{otherwise} \end{cases},$$

$$w_1 = \begin{cases} \frac{1}{\sqrt{2}}, & \text{if } k = 0 \\ 1, & \text{otherwise} \end{cases}$$

DCT Type-VI (DCT-6):

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $$w_0 = \begin{cases} \frac{1}{\sqrt{2}}, & \text{if } n = N-1 \\ 1, & \text{otherwise} \end{cases},$$

$$w_1 = \begin{cases} \frac{1}{\sqrt{2}}, & \text{if } k = 0 \\ 1, & \text{otherwise} \end{cases}$$

-continued

DCT Type-VII (DCT-7):

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$

where $$w_0 = \begin{cases} \frac{1}{\sqrt{2}}, & \text{if } n = 0 \\ 1, & \text{otherwise} \end{cases},$$

$$w_1 = \begin{cases} \frac{1}{\sqrt{2}}, & \text{if } k = N-1 \\ 1, & \text{otherwise} \end{cases}$$

DCT Type-VIII (DCT-8):

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

DST Type-I (DST-1):

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2):

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $$w_0 = \begin{cases} \frac{1}{\sqrt{2}}, & \text{if } k = N-1 \\ 1, & \text{otherwise} \end{cases}$$

DST Type-III (DST-3):

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $$w_0 = \begin{cases} \frac{1}{\sqrt{2}}, & \text{if } n = N-1 \\ 1, & \text{otherwise} \end{cases}$$

DST Type-IV (DST-4):

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5):

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6):

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7)

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8)

$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n,$$

where $$w_0 = \begin{cases} \frac{1}{\sqrt{2}}, & \text{if } n = N-1 \\ 1, & \text{otherwise} \end{cases},$$

$$w_1 = \begin{cases} \frac{1}{\sqrt{2}}, & \text{if } k = N-1 \\ 1, & \text{otherwise} \end{cases}$$

Each of the transform types shown above are specified by the mathematical formulation of the transform basis function. The transform type and the transform size are different features and should not be confused. The transform type refers to basis function, and the transform size refers to the size of the transform. For example, the 4-point DST-VII and the 8-point DST-VII have the same transform type, regardless the value of the size N (e.g., 4-point or 8-point).

Without loss of generality, all the above transform types can be represented using the below generalized formulation:

$$y_m = \sum_{n=0}^{N-1} T_{m,n} x_n,$$

where T is the transform matrix specified by the definition of one certain transform, (e.g., DCT Type-I~DCT Type-VIII, or DST Type-I~DST Type-VIII), and the row vectors of T (e.g., $[T_{i,0}, T_{i,1}, T_{i,2}, \ldots, T_{i,N-1}]$) are the $i^{th}$ transform basis vectors. A transform applied on the N-point input vector is called an N-point transform.

It is also noted that, the above transform formulations, which are applied on the 1D input data x, can be represented in matrix multiplication form as below $$y = T \cdot x$$

where T indicates the transform matrix, x indicates the input data vector, and y indicates the output transform coefficients vector. The transform matrix can also be referred to as a transform kernel or simply a kernel.

For instance, the video encoder may perform the matrix multiplication $y = T \cdot x$ to generate the transform coefficient vector. The video decoder may perform the inverse matrix multiplication to generate the transform vector from the transform coefficient vector.

The transforms introduced above are applied on one-dimensional (1D) input data. In some cases, transforms can be also extended for two-dimensional (2D) input data sources. In one illustrative example, X is an input M×N data array. Some methods of applying a transform on 2D input data includes separable 2D transforms and non-separable 2D transforms.

A separable 2D transform applies 1D transforms for the horizontal and vertical vectors of X sequentially, which can be formulated as below:

$$Y = C \cdot X \cdot R^T$$

where C and R denote the given M×M and N×N transform matrices, respectively.

From the formulation, it can be seen that C applies 1D transforms for the column vectors of X, while R applies 1D transforms for the row vectors of X For simplicity, C and R will be denoted herein as left (vertical) and right (horizontal) transforms, wherein the C and R transforms both form a transform pair. There are cases when C is equal to R, and is an orthogonal matrix. In such a case, the separable 2D transform is determined by just one transform matrix.

A non-separable 2D transform first reorganized all the elements of X into a single vector, namely X', such as by doing the following mathematical mapping as an example:

$$X'_{(i \cdot N+j)} = X_{i,j}$$

Then a 1D transform T' is applied for X' as below:

$$Y = T' \cdot X$$

where T' is an (M*N)×(M*N) transform matrix.

In video coding, separable 2D transforms typically require much less operation (e.g., addition, multiplication) counts as compared to 1D transforms.

In conventional video codecs, such as H.264/AVC, an integer approximation of the 4-point and 8-point DCT Type-II (also referred to as DCT-2) is always applied to both intra and inter-prediction residuals. An intra-prediction residual refers to the residual data resulting from intra-prediction, and an inter-prediction residual refers to the residual data resulting from inter-prediction. To better accommodate the various statistics of residual samples, more flexible types of transforms other than DCT-2 are utilized in new generation video codecs (e.g., HEVC and VVC). For example, in HEVC, an integer approximation of the 4-point Type-VII DST (also referred to as DST-7) is utilized for an intra-prediction residual. It is both theoretically proven and experimentally validated that DST-7 is more efficient than DCT-2 for residual vectors generated along the intra-prediction directions (e.g., for row residual vectors generated by the horizontal intra-prediction direction). See, for example, J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729.

Figures 2A, 2B, 2C, 2D:
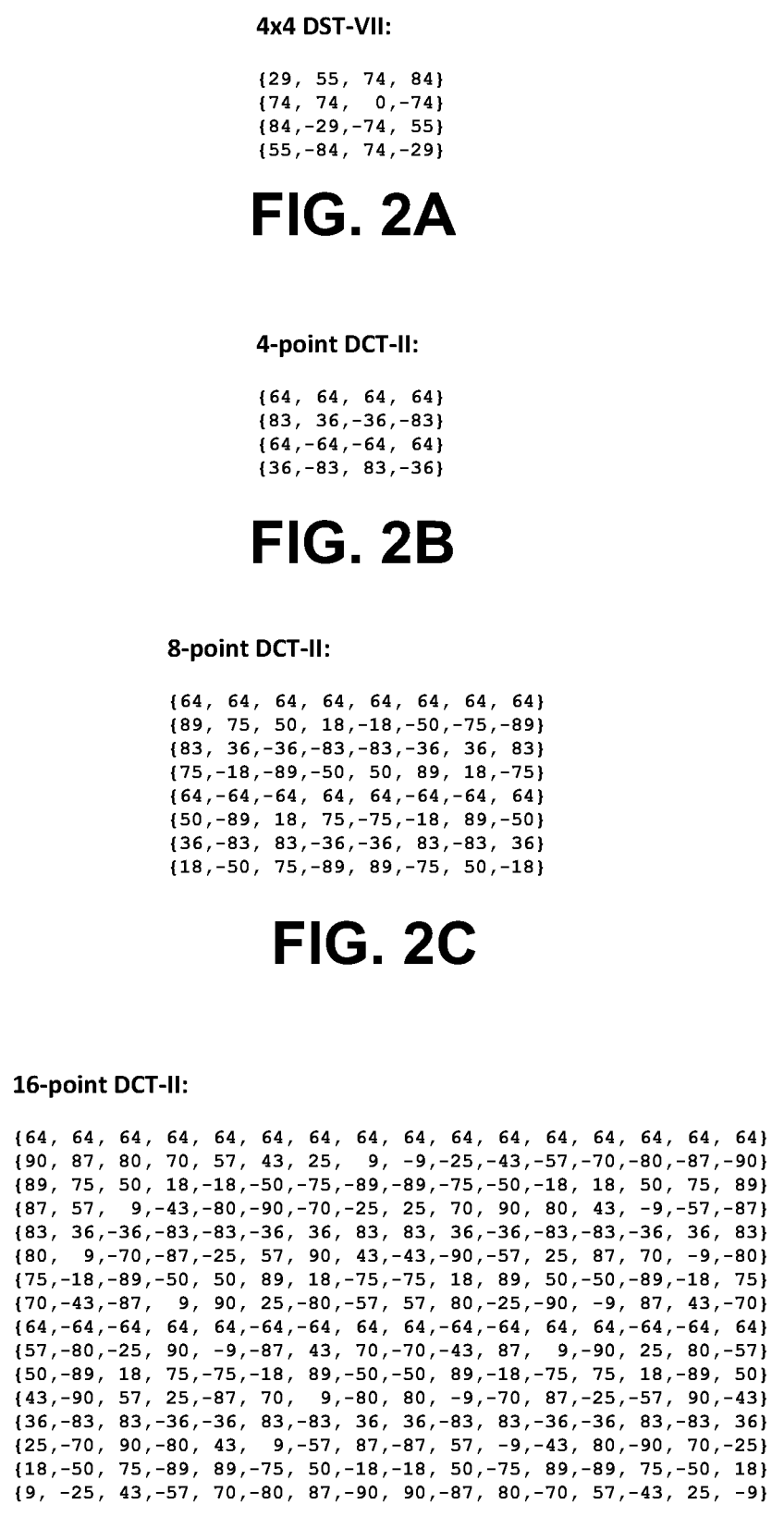

In HEVC, an integer approximation of 4-point DST-7 is applied only for 4×4 luma intra-prediction residual blocks (e.g., TBs). FIG. 2A illustrates an example of the 4-point (4×4) DST-7 transform used in HEVC. In HEVC, for residual blocks that are not 4×4 luma intra-prediction residual blocks, integer approximations of the 4-point, 8-point, 16-point, and 32-point DCT Type-II can be applied. FIG. 2B illustrates an example of the 4-point DCT Type-II transform. FIG. 2C illustrates an example of the 8-point DCT Type-II transform. FIG. 2D illustrates an example of the 16-point DCT Type-II transform. FIG. 2E illustrates an example of the 32-point DCT Type-II transform. FIG. 2B-FIG. 2E illustrate examples of differently sized DCT Type-II transforms. Similar to FIG. 2A-FIG. 2E, there are examples of N-point DCTs and DSTs of different types (e.g., DST Type-VII transforms).

To adapt the various characteristics of the residual blocks, a transform coding structure using the residual quadtree (RQT) is applied in HEVC, as described above. For example, each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure, namely the residual quadtree (RQT). As noted above, in some cases a TU represents transform blocks (TBs) of luma and chroma samples, and corresponding syntax elements.

Figure 3A:
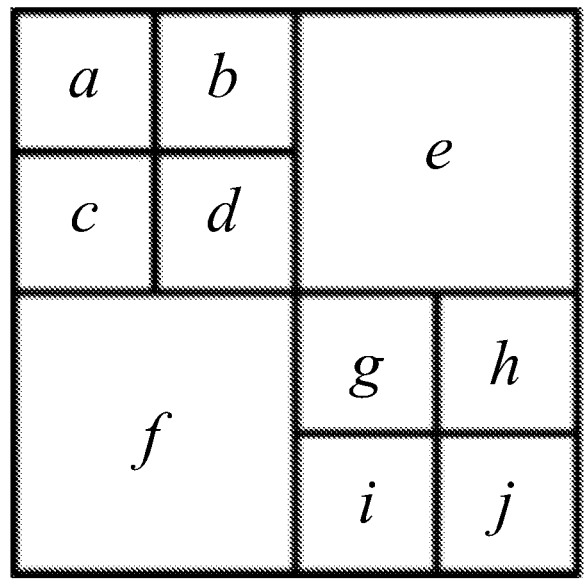
FIG. 3A and FIG. 3B are conceptual diagrams illustrating an example of a transform scheme based on residual quadtree in high efficiency video coding (HEVC), in accordance with some examples.
Figure 3B:
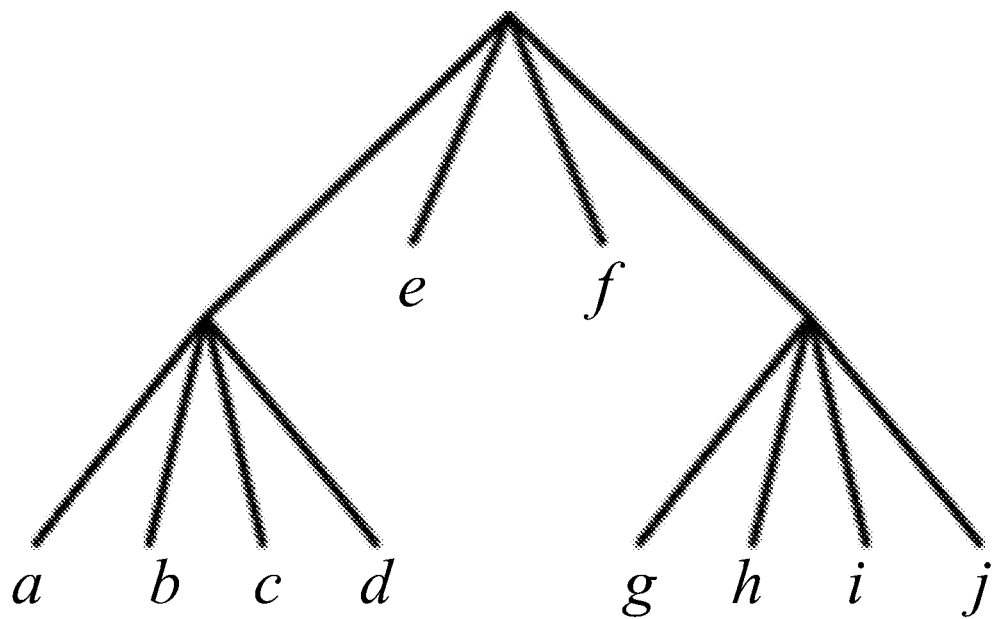

The RQT allows TU sizes from 4×4 up to 32×32 luma samples. FIG. 3A and FIG. 3B are diagrams illustrating an example where a CU includes 10 TUs (labeled with the letters a to j), and also illustrate the corresponding block partitioning. As shown, each node of the RQT is actually a transform unit (TU). The individual TUs can be processed in depth-first tree traversal order, which is illustrated in FIG. 3B as alphabetical order, and which can follow a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision, for example based on rate-distortion optimization techniques. Using the rate-distortion optimization technique, an encoder can calculate a weighted sum of coding bits and reconstruction distortion (e.g., the rate-distortion cost) for each coding mode (e.g., a specific RQT splitting structure), and can select the coding mode with least rate-distortion cost as the best mode.

Three parameters are defined in the RQT: the maximum depth of the tree; the minimum allowed transform size; and the maximum allowed transform size. The minimum and maximum allowed transform sizes can vary within the range from 4×4 to 32×32 samples, which correspond to the supported block transforms mentioned above. The maximum allowed depth of the RQT restricts the number of TUs. A maximum depth equal to zero means that a CB cannot be split any further if each included TB reaches the maximum allowed transform size (e.g., 32×32).

The parameters interact and influence the RQT structure. In one illustrative example in which the root CB size is 64×64, the maximum depth is equal to zero, and the maximum transform size is equal to 32×32. In this example, the CB has to be partitioned at least once, since otherwise it would lead to a 64×64 TB, which is not allowed. The RQT parameters (i.e. maximum RQT depth and the minimum and maximum transform sizes) can be transmitted in the bit-stream (e.g., at the sequence parameter set level or other portion of the bitstream) or using any other suitable technique (e.g., in a supplemental enhancement information (SEI) message). Regarding the RQT depth, different values can be specified and signaled for intra and inter coded CUs.

The quadtree transform is applied for both intra-prediction and inter-prediction residual blocks. Typically, the DCT-2 transform of the same size of the current residual quadtree partition is applied as a default transform for a residual block. However, if the current residual quadtree block is 4×4 and is generated by intra prediction, the above noted 4×4 DST-7 transform is applied.

In HEVC, larger size transforms (e.g., a 64×64 transform) may not be adopted mainly due to the possible limited benefit and relatively high complexity for relatively smaller resolution videos.

Figure 4:
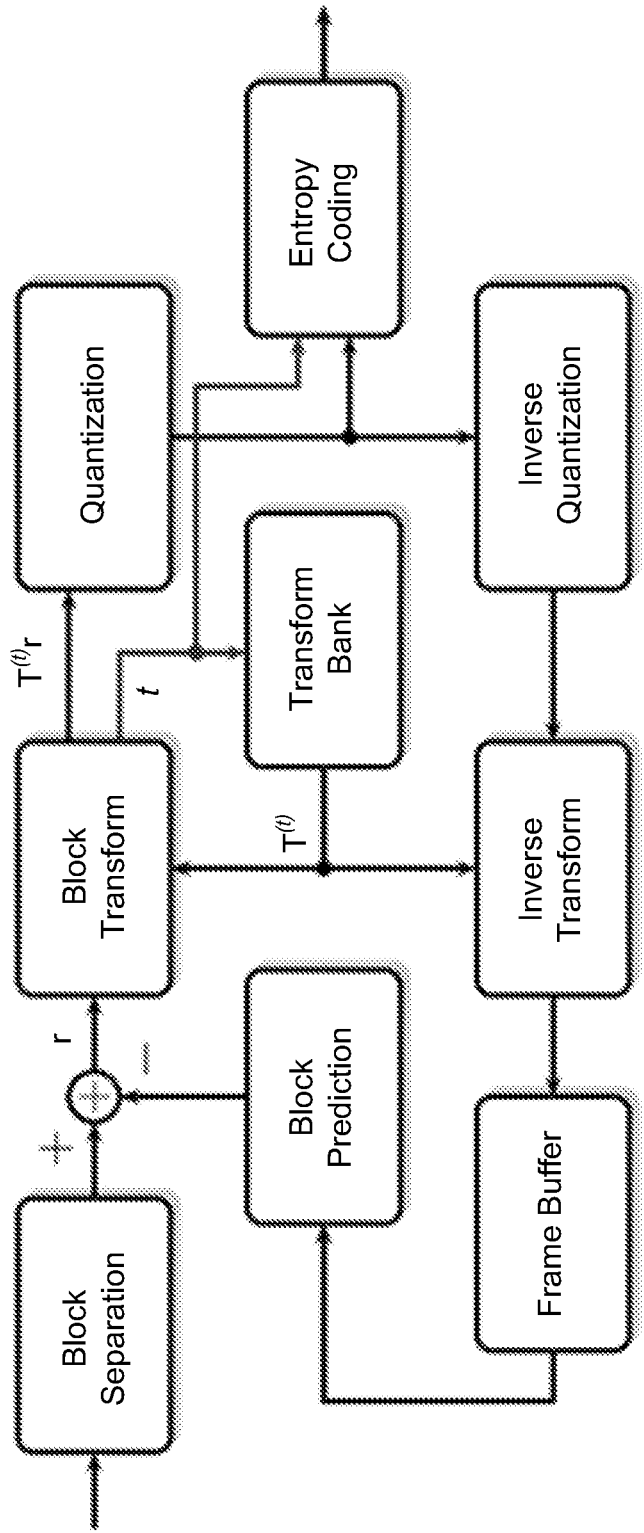
FIG. 4 is a block diagram illustrating an example of a system for hybrid video encoding with adaptive transform selection, in accordance with some examples.
Figure 5A:
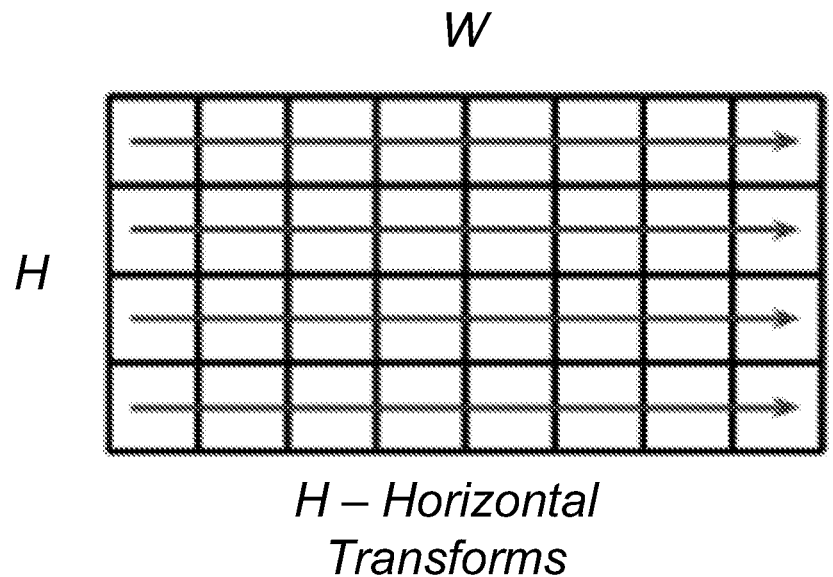
FIG. 5A and FIG. 5B are conceptual diagrams illustrating an example of a separable transform implementation, where horizontal and vertical lines are transformed independently, in accordance with some examples.
Figure 5B:
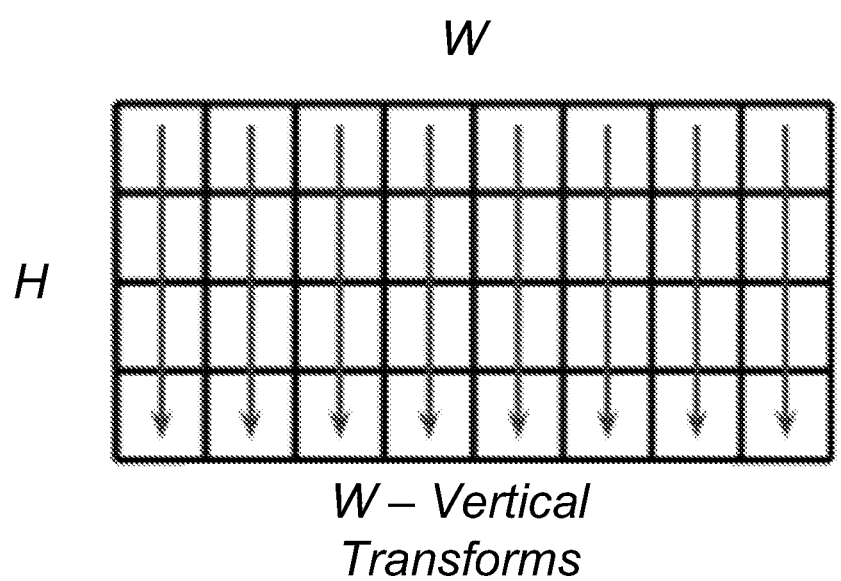

The techniques described herein are applicable to any suitable adaptive transform coding scheme. FIG. 4 is a diagram illustrating an example of a system for hybrid video encoding with adaptive transform selection. For example, for each block of prediction residuals, different transforms can be chosen by the encoder, and the choice of transform is encoded as side information for signaling. In practice, to reduce computational complexity, the block transforms can be computed in a separable manner (i.e., the horizontal and vertical lines are transformed independently, as shown in FIG. 5A and FIG. 5B).

According to video coding standards prior to HEVC (e.g., MPEG-2, AVC, etc.), only a default (or fixed) separable DCT-2 transform is used both vertically and horizontally. In HEVC, in addition to DCT-2, DST-7 is also employed for 4×4 blocks as a default (or fixed) separable transform. Adaptive extensions of those fixed transforms have been developed and adopted in the Joint Experimental Model (JEM) of the Joint Video Experts Team (JVET), and are referred to as adaptive multiple transform (AMT) or enhanced multiple transform (EMT). Some AMT designs offer five transform options for an encoder to select on a per-block basis (e.g., the selection can be performed based on a rate-distortion metric for a coding block, prediction block, or transform block). Then, the selected transform index is signaled by the video encoder with the video bitstream, which can be decoded and analyzed by the video decoder.

Figure 6:
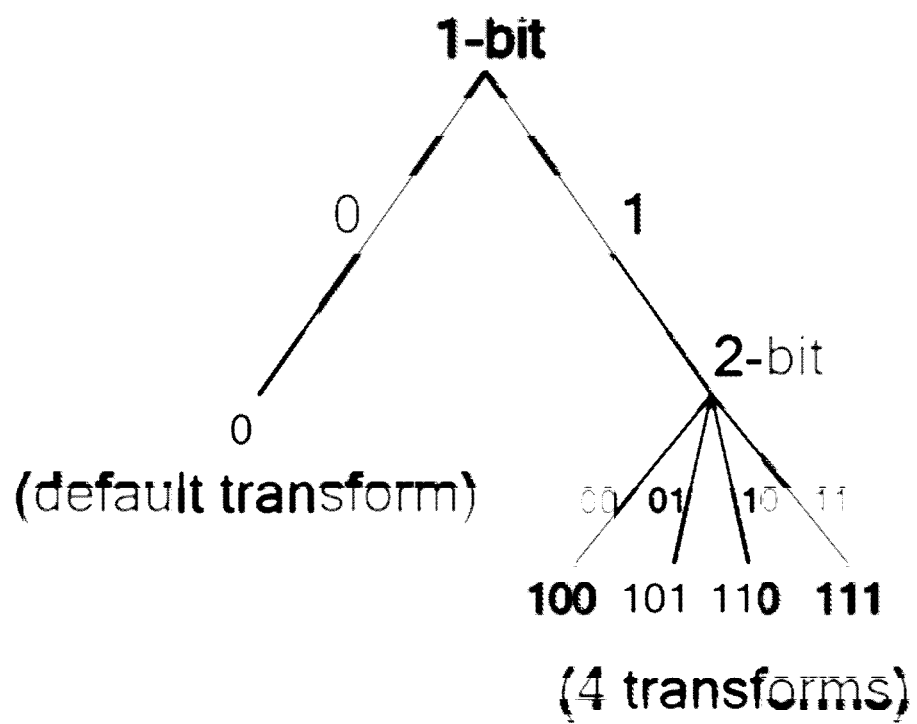
FIG. 6 is a conceptual diagram illustrating an example of transform signaling, in accordance with some examples.

FIG. 6 is a diagram illustrating the signaling for the AMT designs, where one bit is used to signal the default transform and two additional bits (i.e., 3 bits in total) are used to signal four transforms. For example, out of five transforms, one of the transforms (the default transform) can be signaled using a 0 (i.e., 1-bit), and the other four transforms can be signaled using 3-bits (e.g., 100, 101, 110, and 111). For example, the other four transforms can include DST-7 and DCT-8 applied in the horizontal and vertical directions, in which case the total number of combinations is four (using DST-7 in the horizontal and vertical directions, using DST-7 in the horizontal direction and DCT-8 in the vertical direction, using DCT-8 in the horizontal direction and DST-7 in the vertical direction, or using DCT-8 in the horizontal and vertical directions). The default transform is selected as a separable 2D transform that applies DCT-2 both vertically and horizontally. The rest of the AMT transforms are defined based on intra-mode information. An extension can be provided by defining the set of those four transforms based on both prediction mode and block size information.

For example, a video encoder (e.g., encoding device 104) can encode and signal the AMT flag to indicate whether AMT applies to a CU. At a video decoder (e.g., decoding device 112), whether or not AMT applies is controlled by the value of the CU-level AMT flag signaled by the video encoder. For example, at the video decoder, the value of the AMT flag controls the AMT applicability for all transform units (TUs) within the CU for which the flag is received. The video encoder can set the value of the AMT flag to be equal to 0 to indicate that a default transform (e.g., a DCT-2 transform) is applied in the CU to encode the residual signals corresponding to the TUs for that CU. Upon receiving the AMT flag with a value equal to 0 as signaled by video encoder, the video decoder can determine that the default transform (e.g., a DCT-2 transform) is to be applied both vertically and horizontally to decode all TUs of the CU to which the flag applies. For each TU within an AMT-enabled CU (when the AMT flag is equal to 1 for that CU), the video encoder can encode and signal two additional flags (referred to as the AMT index) to identify the horizontal transform and the vertical transform that are to be applied by the video decoder. When the AMT flag is equal to 1, the video decoder can use the two additional flags received with respect to each TU to identify the horizontal and vertical transforms to apply in decoding each TU.

In the VVC reference software, the AMT transforms other than the default DCT-2 transform (e.g., DCT-8, DST-7, among others) are implemented using matrix multiplication, and AMT usage is restricted to blocks with width less than or equal to (<=) 32 and height less than or equal to (<=) 32. In such cases, the maximum size of the AMT matrices used is restricted to 32×32 (corresponding to width x height). This restriction is set to limit memory and computational complexity requirements. For example, allowing usage of AMT in blocks with width or height larger than 32 may provide additional coding gain, but can lead to increased memory and computational complexity.

Systems, apparatuses, methods (also referred to as processes), and computer-readable media are described herein that improve the current AMT design by addressing various problems associated with the current AMT design. For example, one deficiency of the AMT design is that an AMT flag is signaled for all CUs with a width less than or equal to (<=) 32 and a height less than or equal to (<=) 32, based on the restriction noted above that AMT usage is restricted to blocks with width less than or equal to 32 and height less than or equal to 32. However, this restriction does not take into account the dependency of the AMT flag value on related information, such as a shape and size of the block and information from neighboring blocks. As described in more detail below, imposing restrictions on the AMT flag value based on this information can introduce additional coding gain. Signaling of the AMT flag may also be improved by introducing entropy coding (e.g., context adaptive binary arithmetic coding (CABAC), context adaptive variable length coding (CAVLC), or other entropy coding) contexts for the AMT flag based on the shape and/or size of the block and/or based on information from neighboring blocks.

Furthermore, if the AMT flag equals to 1 for a CU, then two additional flags can be signaled for the AMT index per TU in the CU to indicate which AMT transform is used in the horizontal and vertical directions, respectively. Similar to the deficiencies in AMT flag signaling noted above, the signaling of the two additional flags does not take into account the dependency of the AMT index value on related information, such as a shape and size of the block and information from neighboring blocks. Imposing restrictions on the AMT index value and/or changing the signaling of AMT index based on this information can introduce additional coding gains.

In addition to improving coding gains, restricting the value of the AMT flag and/or the AMT index based on shape and size of the block and in some cases information from neighboring blocks may improve the runtime of the encoder and thus reduce encoder complexity by skipping some rate-distortion optimization checks.

Various techniques are described below for improving performance of AMT or any other adaptive transform scheme. The techniques described herein may be applied individually or in any combination.

In some examples, the usage of AMT is relaxed so that AMT can be used for blocks other than those having a width less than or equal to 32 and a height less than or equal to 32. It is noted that the current restriction requires both the weight and height of a block to be less than a size of 32. According to examples provided herein, the use of AMT is allowed for a block (e.g., a CU) if the width of the block (or a sub-block of the block, such as a PU, TU, or other block) is less than or equal to a threshold width denoted as Th1 (width<=Th1) or height of the block (or a sub-block of the block) is less than or equal to a threshold height denoted as Th2 (height<=Th2). In one illustrative example, the thresholds Th1 and Th2 can be set to a value of 32 (e.g., Th1=Th2=32). However, one of skill will appreciate that other values can be used for the thresholds Th1 and Th2.

Such a restriction requires only the width or the height of the block (or sub-block) to be less than the respective threshold Th1 or Th2. For instance, AMT is not allowed (in which case the AMT flag is set to 0) if both the width is greater than Th1 (width>Th1) and the height is greater than Th2 (height>Th2). If the width less than or equal to (<=) Th1 or the height less than or equal to (<=) Th2, then the AMT flag is signaled for the block to indicate whether AMT is used for the block. For instance, an AMT flag with a value of 0 for a CU indicates to a decoder that AMT is not used for that CU and thus that a default transform (e.g., DCT-2) is to be used for that CU. An AMT flag with a value of 1 for a CU indicates to a decoder that AMT can be used for that CU, and thus that a transform other than the default transform can be used, such as DST-7, DCT-8, or other AMT transform other than the default transform (e.g., DCT-2).

In some cases, if the width of the block (or sub-block) is less than or equal to (<=) Th1, the height is greater than (>) Th2, and the AMT flag for the block equals 1, then only one index flag is signaled to indicate whether the horizontal transform is from the available AMT transform kernels (e.g. DCT-8, DST-7, or other AMT transform), and the vertical transform is fixed to the default transform (e.g., fixed to DCT-2) based on the height being greater than Th2. In some cases, if width is greater than (>) Th1, the height is less than or equal to (<=) Th2, and the AMT flag for the block equals 1, then only one index flag is signaled to indicate whether the vertical transform is from the available transform kernels (e.g., DCT-8, DST-7, or other AMT transform), and the horizontal transform is fixed to the default transform (e.g., fixed to DCT-2) based on the width being greater than Th1.

By relaxing the restriction on which blocks can have AMT transforms applied to them, coding efficiencies can be gained. Further, allowing only one AMT index flag to be signaled based on whether only one of the width or height is less than the threshold width or height (Th1 or Th2), respectively, more flexibility is provided to allow a separable horizontal or vertical AMT transform other than the default transform to be applied (e.g., a horizontal AMT transform other than the default is applied when width is less than or equal to Th1 and height is greater than Th2, or a vertical AMT transform other than the default is applied when height is less than or equal to Th2 and width is greater than Th1), while the default transform (e.g., DCT-2) is applied for the other direction (e.g., default vertical transform when width is less than or equal to Th1 and height is greater than Th2, or default horizontal transform when height is less than or equal to Th2 and width is greater than Th1).

Techniques are also described for improving AMT performance when explicit signaling is used. Explicit signaling indicates that the AMT flag can be signaled for a block (e.g., a CU) in the bitstream (or separately from the bitstream, such as in an SEI message) to indicate whether AMT is to be used for the block. According to examples provided herein, the AMT flag can be explicitly signaled, but the signaling of the AMT flag can be restricted based on a size of a block, such as a CU, TU, PU, or other block. For instance, the AMT flag may not be signaled for a block and instead a value of the AMT flag can be restricted to a certain value if the width and height of the block (or sub-block of the block, such as a PU or TU) meet certain conditions, allowing a decoder to implicitly derive the restricted value of the AMT flag without requiring signaling information (e.g., an AMT flag) to determine the AMT flag value. While examples of explicit signaling are described below using a CU as an example of a block, the size comparisons and thresholds can be based on a size of other blocks, such as PUs, TUs, or other blocks.

In one illustrative example, an AMT flag for a CU can be restricted to a value of 0 without signaling, if the width and height of the CU satisfy the condition that the width of the CU is less than or equal to (<=) a threshold width (denoted as Th3) and the height of the CU is less than or equal to (<=) a threshold height (denoted as Th4). In one illustrative example, Th3 and Th4 can both be set to 4. As noted above, an AMT flag with a value of 0 for a CU indicates to a decoder that AMT is not used for that CU and thus that a default transform (e.g., DCT-2) is to be used for that CU. An AMT flag with a value of 1 for a CU indicates to a decoder that AMT can be used for that CU, and thus that a transform other than the default transform can be used, such as DST-7, DCT-8, or other AMT transform. In such an illustrative example where Th3 and Th4 are set to 4, an AMT flag for a CU can be restricted to a value of 0 without signaling, if the width of the CU has a size of 4×4 or less, in which case a decoder can derive a value of 0 for the AMT flag for 4×4 CUs (or smaller CUs) without requiring an encoder to place the AMT flag in the bitstream for such 4×4 (or smaller) CUs. The default transform (e.g., e.g., DCT-2) can be used by a decoder and/or an encoder for the 4×4 CUs (and for smaller CUs). In such an example, the encoder can include the AMT flag in the bitstream for any CU that is larger than 4×4, in accordance with any other restrictions that might be placed on the AMT flag. A transform other than the default transform can be used for any CU that is larger than 4×4, such as DST-7, DCT-8, or other AMT transform. One of ordinary skill will appreciate that the thresholds Th3 and Th4 can be set to any other suitable value, and can have the same values or can include different values (e.g., Th3=8 and Th4=8, Th3=4 and Th4=8, or other suitable values).

In another illustrative example, an AMT flag for a CU can be restricted to a value of 0 without signaling, if the width and height of the CU satisfy the condition that the width is greater than or equal to a first multiple (denoted as Th5) times the height of the block (denoted as width>=Th5*height) or the height is greater than or equal to a second multiple (denoted as Th6) times the width of the block (denoted as height>=Th6*width). In one illustrative example, Th5 and Th6 can be set to 8. This condition (width>=Th5*height or height>=Th6*width) can be used for narrow blocks (with a height much greater than the width or a width much greater than the height). In such an illustrative example where Th5 and Th6 are set to 8, a block having a size of 4×32 (width×height) can meet the condition that height(32)>=Th6(8)*width(4). For such a narrow block, the transform choice can be fixed without signaling (the AMT flag is fixed or restricted to a value of 0, indicating that a default transform, such as DCT-2, is to be used for that block), since it may be difficult to find a transform kernel that will be efficient for the short and long sides of the block at the same time. One of ordinary skill will appreciate that the multiples Th5 and Th6 can be set to any other suitable value, and can have the same values or can include different values (e.g., Th5=2 and Th6=2, Th5=2 and Th6=3, or other suitable values).

In another illustrative example, an AMT flag for a CU can be restricted to a value of 0 without signaling, if the width and height of the CU satisfy the condition that width is less than or equal to (<=) a threshold width (denoted as Th7) or height is less than or equal to (<=) a threshold height (denoted as Th8). In one illustrative example, Th7 and Th8 can be set to 4. In such an illustrative example where Th7 and Th8 are set to 4, an AMT flag for a CU can be restricted to a value of 0 without signaling, if the width or the height of the CU has a size of 4 or less (e.g., a CU having a size of 4×8, 8×4, or other suitable size). In such an example, a decoder can derive a value of 0 for a 4×4 CU without requiring an encoder to place the AMT flag in the bitstream for the CU. According to such an example, the encoder can include the AMT flag in the bitstream for any CU that has a width and height larger than 4, in accordance with any other restrictions that might be placed on the AMT flag. One of ordinary skill will appreciate that the thresholds Th7 and Th8 can be set to any other suitable value, and can have the same values or can include different values (e.g., Th7=8 and Th8=8, Th7=4 and Th8=8, or other suitable values).

In some cases, instead of a restriction, an entropy coding context can be assigned based on the above-described explicit signaling conditions. For instance, instead of using a restriction and not signaling the AMT flag, the encoder can signal the AMT flag with the video bitstream, but can choose an entropy coding context for use by a context-adaptive entropy codec (e.g., a CABAC context for a CABAC encoder or other suitable encoding context) for the block based on the conditions noted above. In one illustrative example, a first context can be assigned to blocks that satisfy the condition that width of a block (e.g., a CU) is less than or equal to the threshold width Th3 and height of the block is less than or equal to the threshold height Th4, and a second context can be assigned to blocks that do not satisfy the condition. In another illustrative example, a first context can be assigned to blocks that satisfy the condition that a width of a block (e.g., a CU) is greater than or equal to the first multiple Th5 times the height of the block (width>=Th5*height) or the height of the block is greater than or equal to the second multiple Th6 times the width of the block (height>=Th6*width), and a second context can be assigned to blocks that do not satisfy the condition. In another example, a first context can be assigned to blocks that satisfy the condition that a width of a block (e.g., a CU) is less than or equal to the threshold width Th7 or the height of the block is less than or equal to the threshold height Th8, and a second context can be assigned to blocks that do not satisfy the condition. The different contexts can be used by the context-adaptive entropy codec (e.g., a CABAC codec or other suitable entropy codec).

Techniques are also described for improving AMT performance when implicit signaling is used. When implicit signaling is used, there is no signaling of an AMT flag (e.g., indicating whether an AMT transform other than the default transform can be used for a CU) or an AMT index (e.g., indicating which AMT transform to use in the horizontal and vertical directions per TU) in the encoded video bitstream for a block. Rather, the transform kernel for the block is derived by the encoder based on one or more conditions without having to test different transforms in order to select which transform is the optimal transform, and derived by the decoder based on the same one or more conditions without the need to refer to any signaling information in the encoded video bitstream.

Using implicit signaling, the horizontal and/or vertical transform can be restricted for a block (e.g., a TU, a PU, CU, or other block) based on the width and height of the block or other block. For instance, the horizontal transform for a TU can be restricted to a certain type of transform based on the width of the TU, and a vertical transform for the TU can be restricted to a certain type of transform based on the height of the TU. In another example, the horizontal transform for a TU can be restricted to a certain type of transform based on the width of the CU that includes the TU, and a vertical transform for the TU can be restricted to a certain type of transform based on the height of the CU. Using such implicit signaling based restrictions, a mix of the different transforms can be selected for the horizontal and vertical directions (e.g., the default transform for the horizontal direction and an AMT transform other than the default transform for the vertical transform). While examples of implicit signaling are described below using a TU as an example of a block with dimensions (e.g., height and width) that are compared to one or more thresholds, the size comparisons and thresholds can be based on a size of other blocks, such as PUs, CUs, or other blocks.

In one example, if the width of a TU is less than or equal to (<=) a threshold width (denoted as Th9), the horizontal transform kernel for that TU is fixed (or restricted) to be an AMT transform other than the default transform (e.g., a DST-7 transform or a DCT-8 transform) without the need for signaling to be included in the video bitstream to indicate the use of that transform for the TU. In such an example, if the width of the TU is greater than (>) the threshold width Th9, the horizontal transform kernel is fixed to be the default transform (e.g., DCT-2) without the need for signaling to be included in the video bitstream to indicate the use of the default transform for the TU.

In another example using implicit signaling, if the height of a TU is less than or equal to (<=) a threshold height (denoted as Th10), the vertical transform kernel for the TU is fixed (or restricted) to be an AMT transform other than the default transform (e.g., a DST-7 transform or a DCT-8 transform) without the need for signaling to be included in the video bitstream to indicate the use of that transform for the TU. In such an example, if the height of the TU is greater than (>) the threshold height Th10, the vertical transform kernel is fixed to be the default transform (e.g., DCT-2) without the need for signaling to be included in the video bitstream to indicate the use of the default transform for the TU.

In some implementations, the fixed AMT transform kernel may be fixed to be DST-7, and the fixed default transform can be fixed to be DCT-2. One of ordinary skill will appreciate that other types of transform kernels can be used for the fixed AMT transform and for the fixed default transform. In one illustrative example, Th9 and Th10 can be set to 4. In such an illustrative example where Th9 and Th10 are set to 4, a TU having a size of 4×8 (width×height) can be processed by an encoder and a decoder. The encoder and the decoder can select an AMT transform other than the default transform (e.g., a DST-7 transform) as the horizontal transform for the TU based on the width (4) of the block being less than or equal to the Th9 (4). The encoder and the decoder can select the default (e.g., a DCT-2 transform) as the vertical transform for the TU based on the height (8) of the block being greater than the Th10 (4). One of ordinary skill will appreciate that the thresholds Th9 and Th10 can be set to any other suitable value, and can have the same values or can include different values (e.g., Th9=8 and Th10=8, Th9=4 and Th10=8, Th9=8 and Th10=4, or other suitable values).

In another illustrative example, a DST-7 transform and/or a DCT-8 transform (e.g., DST-7 for horizontal and vertical directions, DCT-8 for horizontal and vertical directions, DST-7 for the horizontal direction and DCT-8 for vertical direction, or DCT-8 for the horizontal direction and DST-7 for vertical direction) can be used for block sizes of 4×4 and smaller, and DCT-2 can be used for block sizes greater than 4×4. In another illustrative example, a DST-7 and/or a DCT-8 transform (e.g., DST-7 for horizontal and vertical directions, DCT-8 for horizontal and vertical directions, DST-7 for the horizontal direction and DCT-8 for vertical direction, or DCT-8 for the horizontal direction and DST-7 for vertical direction) can be used for block sizes 4×8 and smaller, and DCT-2 transform can be used for block sizes greater than 4×8.

In some cases, instead of a restriction, an entropy coding context can be assigned based on the above-described implicit signaling conditions. For instance, entropy coding contexts can be selected for use by a context-adaptive entropy codec (e.g., a CABAC context for a CABAC encoder or other suitable encoding context) based on the conditions noted above.

In some implementations, in the explicit signaling and in the implicit signaling examples provided above when the various threshold widths and heights are set to small values (e.g., a value of 4, a value of 8, or other small value), an AMT transform other than the default transform (e.g., DST-7, DCT-8, or other AMT transform) can be selected for use for small blocks (e.g., 4×4 blocks or other blocks that are considered small based on the values set for the thresholds) and the default transform (e.g., DCT-2) can be selected for use for larger blocks (e.g., blocks larger than 4×4 blocks, 8×8 blocks, or other small blocks based on the values set for the thresholds) without requiring signaling in the video bitstream for the decoder to make the selections. Such a solution can be beneficial because DCT-2 (as an example of the default transform) can be more efficient from a hardware and software perspective than the larger AMT transforms (e.g., the larger DST-7 and DCT-8 transforms), and because the gain in efficiency introduced by using one of the larger AMT transforms may not be large enough to justify using those AMT transforms for the larger blocks. Restricting the use of the larger AMT transforms to smaller blocks in addition to removing the need to signal the AMT flag and in some cases the AMT index in the bitstream can help to reduce the complexity that the AMT transforms introduce while reducing the amount of signaling overhead included in the bitstream, providing a good complexity-efficiency trade-off.

Furthermore, the implicit signaling techniques described above provide even more efficiencies. For example, when explicit signaling is used, the encoder applies the different transforms and selects the transform that provides the best performance (e.g., based on the rate-distortion optimization). The selected option is then included as signaling overhead (e.g., as an AMT flag and/or as an AMT index when the AMT flag is equal to 1 for a CU) in the video bitstream for use by the decoder to determine which transform to apply. The searching and selection process by the encoder causes the complexity of the encoder to be higher than that required for implicit signaling. In the implicit signaling examples described above, the transform choice is fixed (or predefined) for selection (by the encoder and decoder) based on the conditions without requiring the encoder to test different options and select the best performing transform, thus reducing encoder complexity by skipping some rate-distortion optimization checks. An additional advantage of the implicit signaling examples described that use a fixed transform is that there is no overhead needed, providing more efficiency. For example, the AMT flag is not needed to indicate whether AMT can be used for a CU and the AMT index is not needed to indicate which AMT transform to use because the transform for each TU is predefined.

Figure 7:
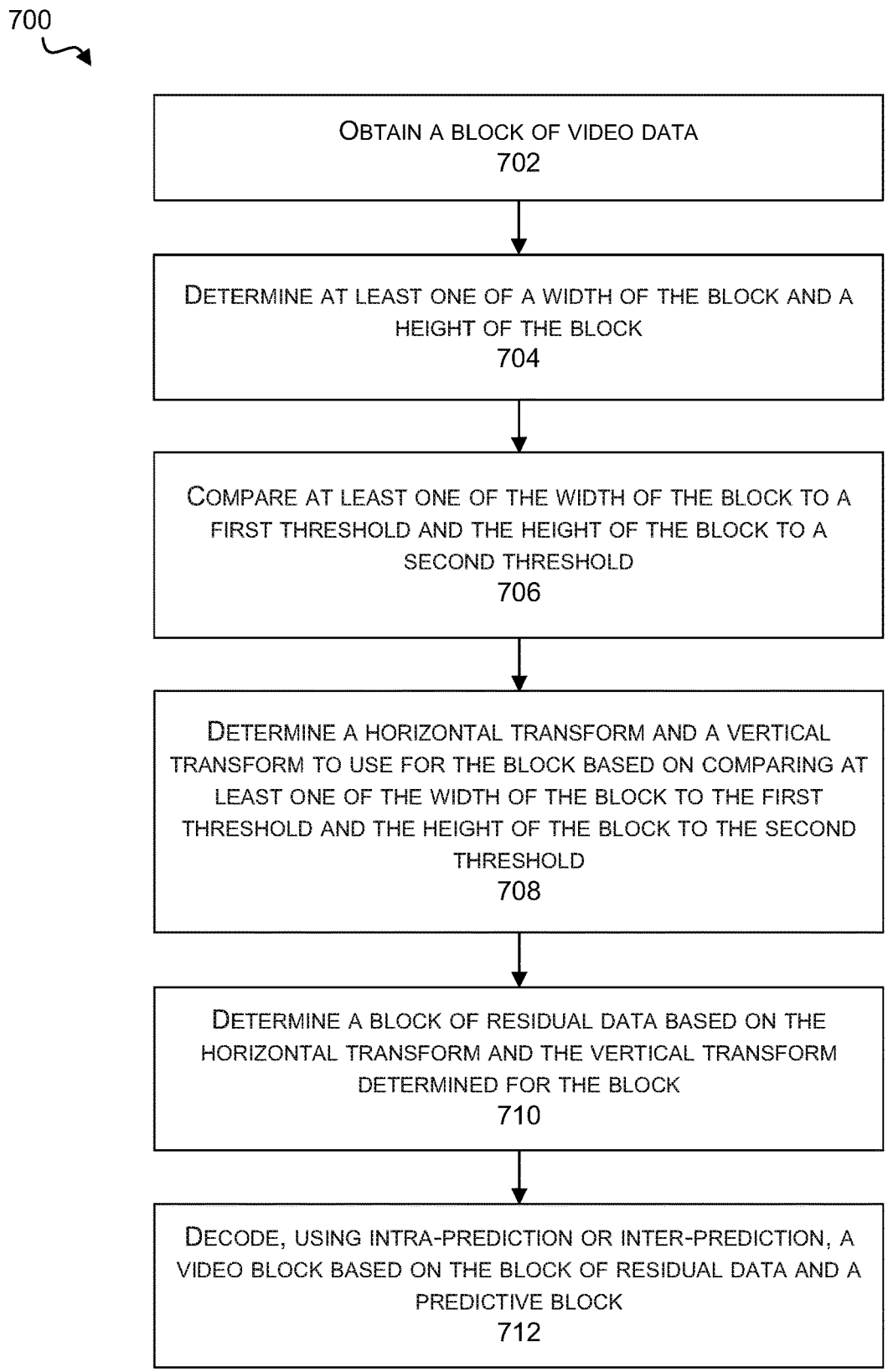
FIG. 7 is a flow chart illustrating an example of a process for decoding video data, in accordance with some examples.

FIG. 7 is a flowchart illustrating an example of a process 700 for decoding video data using the implicit signaling techniques described herein. The process 700 can be performed by a video decoder, such as the decoding device 112 of FIG. 1 and/or FIG. 12. In some cases, when the process 700 is performed by a video decoder, the video data can include a coded picture or a portion (e.g., one or more blocks) of the coded picture included in an encoded video bitstream or can include multiple coded pictures included in the encoded video bitstream.

At block 702, the process 700 includes obtaining a block of the video data. The block of video data can include a coding unit (CU), a transform unit (TU), a prediction unit (PU), or other block of video data. At block 704, the process 700 includes determining at least one of a width of the block and a height of the block. For example, the process 700 can determine a width of the block, a height of the block, or the width and the height of the block. In some cases, when the block is a CU, the process 700 can determine a width of the CU, a height of the CU, or the width and the height of the CU. In some cases, when the block is a TU, the process 700 can determine a width of the TU, a height of the TU, or the width and the height of the TU.

At block 706, the process 700 includes comparing at least one of the width of the block to a first threshold and the height of the block to a second threshold. In one illustrative example, the first threshold can include the threshold width Th9 described above and the second threshold can include the threshold height Th10 described above.

At block 708, the process 700 includes determining a horizontal transform and a vertical transform to use for the block based on comparing at least one of the width of the block to the first threshold and the height of the block to the second threshold. The horizontal transform and the vertical transform are determined without decoding a syntax element that indicates the horizontal transform and the vertical transform. For example, the horizontal transform and the vertical transform can be determined by a decoder for the block without the need to decode one or more syntax elements (e.g., the AMT flag and/or the AMT index) that identifies the horizontal transform and the vertical transform. In such examples, the horizontal transform and the vertical transform can be determined for the block by an encoder without the need for the encoder to include one or more syntax elements in the encoded video bitstream to indicate the determined horizontal and vertical transforms.

In some examples, the horizontal transform is restricted for the block based on the width of the block. For instance, the horizontal transform can be determined for the block based on comparing the width of the block to the first threshold. In some cases, the block is a TU, as noted above, and the horizontal transform is restricted for the TU based on the width of the TU. In some cases, when the block is a CU, the horizontal transform is restricted for a TU of the block based on the width of the block. In one example, the horizontal transform for the block is determined to be a first type of horizontal transform when the width of the block is less than the first threshold. In another example, the horizontal transform for the block is determined to be a second type of horizontal transform when the width of the block is greater than the first threshold. The first type of horizontal transform is different than the second type of horizontal transform. In one illustrative example, the second type of horizontal transform is a discrete cosine transform (DCT) Type-II transform, and the first type of horizontal transform is a transform that is different than a DCT Type-II transform. For instance, the first type of horizontal transform can include one of the AMT transforms other than the DCT Type-II transform described above, such as a discrete sine transform (DST) Type-VII transform or a DCT Type-VIII transform.

In some examples, the vertical transform is restricted for the block based on the height of the block. For instance, the vertical transform can be determined for the block based on comparing the height of the block to the second threshold. In some cases, the block is a TU, as noted above, and the vertical transform is restricted for the TU based on the height of the TU. In some cases, when the block is a CU, the vertical transform is restricted for a TU of the block based on the height of the block. In one example, the vertical transform for the block is determined to be a first type of vertical transform when the height of the block is less than the second threshold. In another example, the vertical transform for the block is determined to be a second type of vertical transform when the height of the block is greater than the second threshold. The first type of vertical transform is different than the second type of vertical transform. In one illustrative example, the second type of vertical transform is the DCT Type-II transform, and the first type of vertical transform is a transform that is different than a DCT Type-II transform. For instance, the first type of vertical transform can include one of the AMT transforms other than the DCT Type-II transform described above, such as the DST Type-VII transform or the DCT Type-VIII transform.

At block 710, the process 700 includes determining a block of residual data based on the horizontal transform and the vertical transform determined for the block. For example, the horizontal transform and the vertical transform can include inverse transforms, and inverse horizontal and vertical transforms can be separately applied to a TU (which as noted above is the obtained block in some examples, or is included in the block when the obtained block is a CU in some examples) to obtain the residual data.

At block 712, the process 700 includes decoding, using intra-prediction or inter-prediction, a video block based on the block of residual data and a predictive block. For example, the video block can be decoded by adding the residual data to the predictive block.

The above-described examples described with respect to FIG. 7 can be used individually or in any combination.

Figure 8:
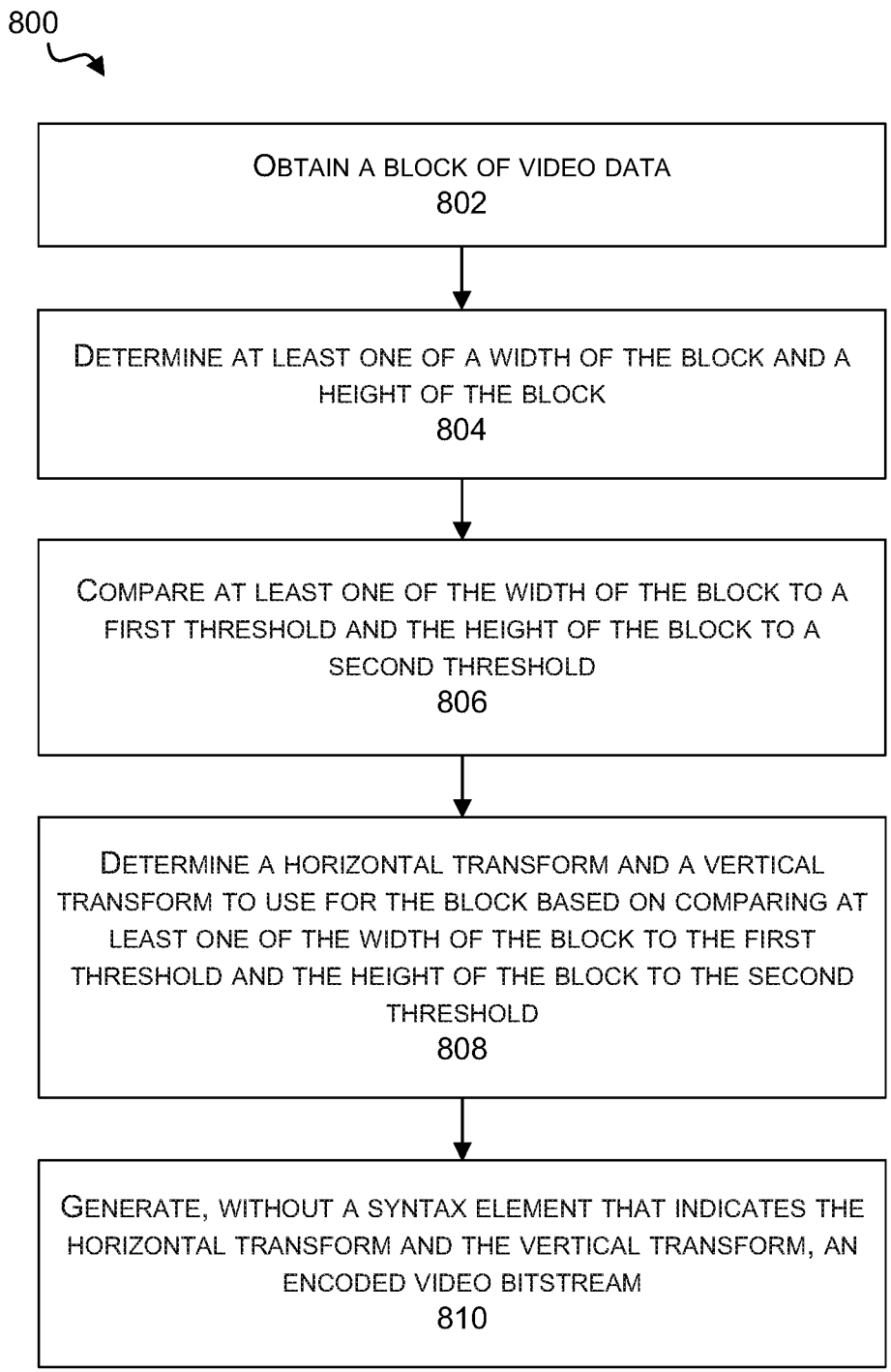
FIG. 8 is a flow chart illustrating an example of a process for encoding video data, in accordance with some examples.

FIG. 8 is a flowchart illustrating an example of a process 800 for encoding video data using the implicit signaling techniques described herein. The process 800 can be performed by a video encoder, such as the encoding device 104 of FIG. 1 and/or FIG. 11. In some cases, when the process 800 is performed by a video encoder, the video data can include a picture or a portion (e.g., one or more blocks) of the picture to be encoded in an encoded video bitstream or can include multiple pictures to be encoded in the encoded video bitstream.

At block 802, the process 800 includes obtaining a block of the video data. The block of video data can include a CU, a TU, a PU, or other block of video data. At block 804, the process 800 includes determining at least one of a width of the block and a height of the block. For example, the process 800 can determine a width of the block, a height of the block, or the width and the height of the block. In some cases, when the block is a CU, the process 800 can determine a width of the CU, a height of the CU, or the width and the height of the CU. In some cases, when the block is a TU, the process 800 can determine a width of the TU, a height of the TU, or the width and the height of the TU.

At block 806, the process 800 includes comparing at least one of the width of the block to a first threshold and the height of the block to a second threshold. In one illustrative example, the first threshold can include the threshold width Th9 described above and the second threshold can include the threshold height Th10 described above.

At block 808, the process 800 includes determining a horizontal transform and a vertical transform to use for the block based on comparing at least one of the width of the block to the first threshold and the height of the block to the second threshold. At block 810, the process includes generating, without a syntax element that indicates the horizontal transform and the vertical transform, an encoded video bitstream. The horizontal transform and the vertical transform are determined by the encoder for the block without the need to signal one or more syntax elements (e.g., the AMT flag and/or the AMT index) in the encoded video bitstream that identify the horizontal transform and the vertical transform. As described above with respect to FIG. 7, a process can be performed by a decoding device to determine the horizontal transform and the vertical transform without the need to decode one or more syntax elements that indicate the horizontal transform and the vertical transform.

In some examples, the horizontal transform is restricted for the block based on the width of the block. For instance, the horizontal transform can be determined for the block based on comparing the width of the block to the first threshold. In some cases, the block is TU, as noted above, and the horizontal transform is restricted for the TU based on the width of the TU. In some cases, when the block is a CU, the horizontal transform is restricted for a TU of the block based on the width of the block. In one example, the horizontal transform for the block is determined to be a first type of horizontal transform when the width of the block is less than the first threshold. In another example, the horizontal transform for the block is determined to be a second type of horizontal transform when the width of the block is greater than the first threshold. The first type of horizontal transform is different than the second type of horizontal transform. In one illustrative example, the second type of horizontal transform is a discrete cosine transform (DCT) Type-II transform, and the first type of horizontal transform is a transform that is different than a DCT Type-II transform. For instance, the first type of horizontal transform can include one of the AMT transforms other than the DCT Type-II transform described above, such as a discrete sine transform (DST) Type-VII transform or a DCT Type-VIII transform.

In some examples, the vertical transform is restricted for the block based on the height of the block. For instance, the vertical transform can be determined for the block based on comparing the height of the block to the second threshold. In some cases, the block is TU, as noted above, and the vertical transform is restricted for the TU based on the height of the TU. In some cases, when the block is a CU, the vertical transform is restricted for a TU of the block based on the height of the block. In one example, the vertical transform for the block is determined to be a first type of vertical transform when the height of the block is less than the second threshold. In another example, the vertical transform for the block is determined to be a second type of vertical transform when the height of the block is greater than the second threshold. The first type of vertical transform is different than the second type of vertical transform. In one illustrative example, the second type of vertical transform is the DCT Type-II transform, and the first type of vertical transform is a transform that is different than a DCT Type-II transform. For instance, the first type of vertical transform can include one of the AMT transforms other than the DCT Type-II transform described above, such as the DST Type-VII transform or the DCT Type-VIII transform.

In some examples, the process 800 includes generating a transform block including one or more transform coefficients based on application of the horizontal transform and the vertical transform to residual data. For example, the horizontal transform and the vertical transform can be separately applied to a TU (which as noted above is the obtained block in some examples, or is included in the block when the obtained block is a CU in some examples) that includes a block of residual data determined by removing a prediction block from a current block. Based on application of the horizontal transform and the vertical transform to the residual data of the TU, transform coefficients can be generated and included in the transform block. The process 800 can further include encoding the transform block and including the encoded transform block in the encoded video bitstream.

The above-described examples described with respect to FIG. 8 can be used individually or in any combination.

Figure 9:
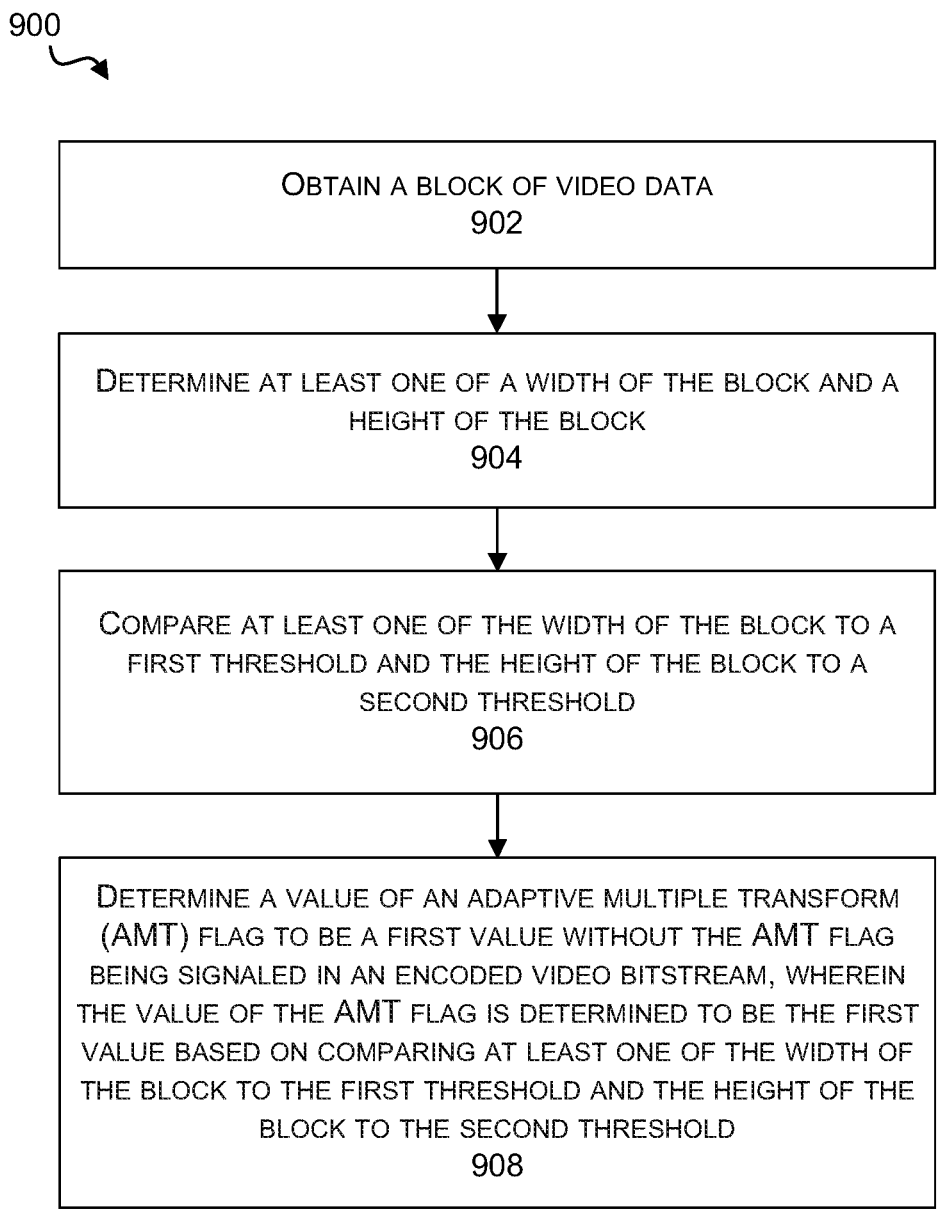
FIG. 9 is a flow chart illustrating another example of a process for decoding video data, in accordance with some examples.

FIG. 9 is a flowchart illustrating an example of a process 900 for decoding video data using the explicit signaling techniques described herein. The process 900 can be performed by a video decoder. In some cases, when the process 900 is performed by a video decoder, the video data can include a coded picture or a portion (e.g., one or more blocks) of the coded picture included in an encoded video bitstream or can include multiple coded pictures included in the encoded video bitstream.

At block 902, the process 900 includes obtaining a block of the video data. The block of video data can include a coding unit (CU), a transform unit (TU), a prediction unit (PU), or other block of video data. At block 904, the process 900 includes determining at least one of a width of the block and a height of the block. For example, the process 900 can determine a width of the block, a height of the block, or the width and the height of the block. In some cases, when the block is a CU, the process 900 can determine a width of the CU, a height of the CU, or the width and the height of the CU. In some cases, when the block is a TU, the process 900 can determine a width of the TU, a height of the TU, or the width and the height of the TU.

At block 906, the process 900 includes comparing at least one of the width of the block to a first threshold and the height of the block to a second threshold. At block 908, the process 900 includes determining a value of an adaptive multiple transform (AMT) flag to be a first value without the AMT flag being signaled in an encoded video bitstream. The value of the AMT flag is determined to be the first value based on comparing at least one of the width of the block to the first threshold and the height of the block to the second threshold. In some examples, the first value of the AMT flag indicates that a first residual transform is used for the block, and a second value of the AMT flag indicates that a second residual transform is used for the block.

In some examples, the value of the AMT flag is determined to be the first value without the AMT flag being signaled in the encoded video bitstream when at least one of the width is greater than the first threshold and the height is greater than the second threshold. In some cases, the first threshold is based on a first multiple times the height of the block, and the second threshold is based on a second multiple times the width of the block. In one illustrative example, the first multiple is the multiple Th5 described above, and the second multiple is the multiple Th6 described above.

In some examples, the value of the AMT flag is determined to be the first value without the AMT flag being signaled in the encoded video bitstream when at least one of the width is less than the first threshold and the height is less than the second threshold. In one illustrative example, the first threshold is the threshold width Th7 described above, and the second threshold is the threshold height Th8 described above.

In some examples, the process 900 can include determining a block of residual data based on the horizontal transform and the vertical transform determined for the block. For example, the horizontal transform and the vertical transform can include inverse transforms, and inverse horizontal and vertical transforms can be separately applied to a TU (which as noted above is the obtained block in some examples, or is included in the block when the obtained block is a CU in some examples) to obtain the residual data. The process 900 can further include decoding, using intra-prediction or inter-prediction, a video block based on the block of residual data and a predictive block. For example, the video block can be decoded by adding the residual data to the predictive block.

The above-described examples described with respect to FIG. 9 can be used individually or in any combination.

Figure 10:
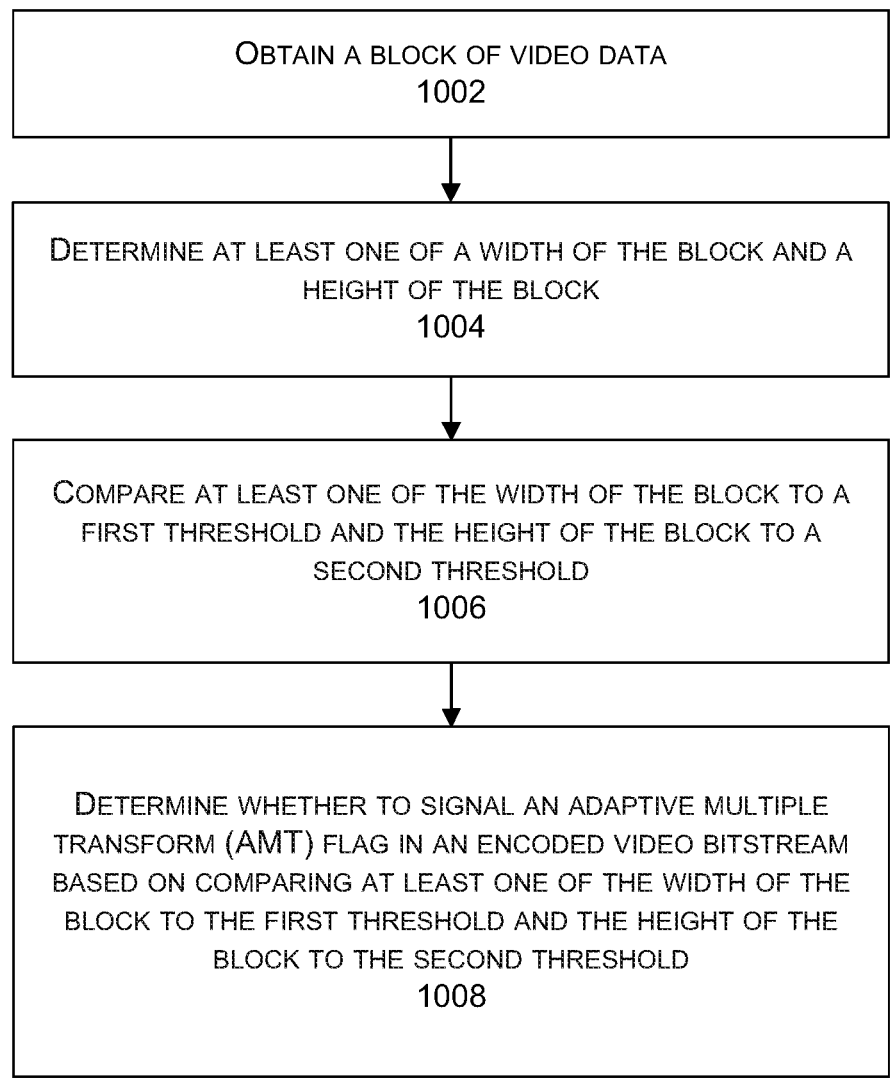
FIG. 10 is a flow chart illustrating another example of a process for encoding video data, in accordance with some examples.

FIG. 10 is a flowchart illustrating an example of a process 1000 for encoding video data using the explicit signaling techniques described herein. The process 1000 can be performed by a video encoder. In some cases, when the process 1000 is performed by a video encoder, the video data can include a picture or a portion (e.g., one or more blocks) of the picture to be encoded in an encoded video bitstream or can include multiple pictures to be encoded in the encoded video bitstream.

At block 1002, the process 1000 includes obtaining a block of the video data. The block of video data can include a CU, a TU, a PU, or other block of video data. At block 1004, the process 1000 includes determining at least one of a width of the block and a height of the block. For example, the process 1000 can determine a width of the block, a height of the block, or the width and the height of the block. In some cases, when the block is a CU, the process 1000 can determine a width of the CU, a height of the CU, or the width and the height of the CU. In some cases, when the block is a TU, the process 1000 can determine a width of the TU, a height of the TU, or the width and the height of the TU.

At block 1006, the process 1000 includes comparing at least one of the width of the block to a first threshold and the height of the block to a second threshold. At block 1008, the process 1000 includes determining whether to signal an adaptive multiple transform (AMT) flag in an encoded video bitstream based on comparing at least one of the width of the block to the first threshold and the height of the block to the second threshold.

In some examples, the AMT flag is determined not to be signaled in the encoded video bitstream when at least one of the width is greater than the first threshold and the height is greater than the second threshold. In some cases, the first threshold is based on a first multiple times the height of the block, and the second threshold is based on a second multiple times the width of the block. In one illustrative example, the first multiple is the multiple Th5 described above, and the second multiple is the multiple Th6 described above.

In some examples, the AMT flag is determined not to be signaled in the encoded video bitstream when at least one of the width is less than the first threshold and the height is less than the second threshold. In one illustrative example, the first threshold is the threshold width Th7 described above, and the second threshold is the threshold height Th8 described above.

In some examples, the process 1000 includes generating a transform block including one or more transform coefficients based on application of the horizontal transform and the vertical transform to residual data. For example, the horizontal transform and the vertical transform can be separately applied to a TU (which as noted above is the obtained block in some examples, or is included in the block when the obtained block is a CU in some examples) that includes a block of residual data determined by removing a prediction block from a current block. Based on application of the horizontal transform and the vertical transform to the residual data of the TU, transform coefficients can be generated and included in the transform block. The process 1000 can further include encoding the transform block and including the encoded transform block in the encoded video bitstream.

The above-described examples described with respect to FIG. 10 can be used individually or in any combination.

In some examples, the processes 700, 800, 900, and 1000 may be performed by a computing device or an apparatus, such as the encoding device 104, the decoding device 112, or any other computing device. In some cases, the computing device or apparatus may include one or more input devices, one or more output devices, one or more processors, one or more microprocessors, one or more microcomputers, and/or other component(s) that is/are configured to carry out the steps of processes 700, 800, 900, and 1000. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of an output device), a network interface configured to communicate and/or receive data, one or more receivers, transmitters, and/or transceivers (as examples of input devices and/or output devices) configured to communicate the video data. In some examples, the network interface, transceiver, and/or transmitter may be configured to communicate Internet Protocol (IP) based data or other network data.

In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some examples, a camera or other capture device that captures the video data is separate from the computing device, in which case the computing device receives the captured video data.

Processes 700, 800, 900, and 1000 are illustrated as logical flow diagrams, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 700, 800, 900, and 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Other techniques for improving AMT are also provided herein. In some examples, the horizontal and/or vertical transform for a current TU are restricted based on the coded block flag (CBF) flags of the neighboring TUs to the left of the current TU (referred to as a left-neighboring TU) and above the current TU (referred to as an above-neighboring TU). A CBF flag indicates whether at least one non-zero transform coefficient is transmitted for the whole CU. For example, if the CBF flag for a left-neighboring TU is 0, then the horizontal transform is fixed for the current TU without signaling. In one illustrative example, the horizontal transform may be fixed to be DST-7. In another example, if the CBF flag for the above-neighboring TU is 0, then the vertical transform is fixed for the current TU without signaling. In one illustrative example, the vertical transform may be fixed to be DST-7. One of ordinary skill will appreciate that other types of transforms can be used. In some cases, instead of a restriction, an entropy coding context can be assigned based on the proposed rules.

In some examples, for small blocks (e.g., 4×4 blocks) and/or for rectangular blocks with a small width or height (e.g., 4×N or N×4 blocks), a DST Type-IV (DST-4) transform may be used as an alternative to DST-7 as a 4-point transform. Similarly, a DCT Type-IV (DCT-4) transform can be used as an alternative to DCT-8. In some cases, such a technique can be extended to blocks with different sizes (e.g., 8×8, 8×N, among other sizes).

In some examples, a vertical and/or horizontal 1D transform can also be fixed based on the type of partitioning applied to the block. Examples of partitioning include residual block partitioning such as RQT (discussed above). If both horizontal and vertical transforms are fixed, no transform signaling is required. In such examples, if only one 1D transform is fixed, the other 1D transform is signaled using a flag. In some cases, instead of a restriction, an entropy coding context can be assigned based on the proposed rules.

In some examples, the AMT index for a TU can be fixed without signaling if the number of non-zero coefficients after transform is less than or equal to a threshold number. In some cases, the AMT index can be fixed such that the horizontal and vertical transforms are DST-7. In one illustrative example, the threshold number can be set to 2. One of ordinary skill will appreciate that other types of transforms and threshold values can be used. In some cases, instead of a restriction, an entropy coding context can be assigned based on the proposed rules.

In some examples, different entropy coding contexts (e.g., CABAC contexts) can be used for signaling of AMT flag for a CU based on whether (CU height==CU width) or (CU height<CU width) or (CU height>CU width).

In some examples, different CABAC contexts can be used for signaling of an AMT flag for a CU based on the AMT flags for left and top neighboring CUs (e.g., one context for each of the following values of left and top AMT flags: 00, 01 or 10 and 11).

In some examples, different CABAC contexts can be used each for signaling a horizontal AMT transform for a TU based on whether (TU height==TU width) or (TU height<CU width) or (TU height>CU width). Similar contexts can be used to signal the vertical AMT transform for the TU.

In some examples, different CABAC contexts can be used for signaling a horizontal AMT transform index for a TU based on CBF flags of the neighboring TUs. Neighbor blocks can include left and above, and for example, one context for each of the following values of the left and top CBF flags: 00, 01 or 10 and 11. In another example, context can be defined as a sum of neighbor CBF flags such as leftCBF+aboveCBF if using only left and above neighbor blocks. Similar contexts can be used to signal vertical AMT. Similar methods for context design based on the neighbor CBF flags can be applied to AMT flag signaling.

Signaling of an AMT flag for a CU can be changed and/or the AMT flag can be derived without signaling based on other existing CU related information, such as prediction mode, merge mode, skip flag, CBF flag, number of non-zero transform coefficients, neighboring blocks' skip and/or CBF flags, among others.

Signaling of horizontal or vertical AMT indices or both for a TU can be changed or can be derived without signaling based on other existing TU related information, such as prediction mode, merge mode, skip flag, CBF flag, number of non-zero transform coefficients, neighboring blocks' skip and/or CBF flags, among others.

In some examples, an AMT flag and/or AMT indices can be signaled using context depending on the block shape. For example, one context can be assigned for rectangular blocks and another context can be assigned for square blocks. For rectangular blocks, whether the height or width is longer can be additionally considered for context derivation.

In some implementations, any of the techniques described above may be used only for inter-coded blocks, only for intra-coded blocks, or for both inter-coded blocks and intra-coded blocks.

The coding techniques discussed herein may be implemented in an example video encoding and decoding system (e.g., system 100). In some examples, a system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from the source device to the destination device. In one example, the computer-readable medium may comprise a communication medium to enable the source device to transmit the encoded video data directly to the destination device in real-time. The encoded video data may be modulated according to a communication standard, such as a wireless communication protocol, and transmitted to the destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the destination device.

In some examples, the encoded data may be output from an output interface to a storage device. Similarly, the encoded data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. Destination device may access the stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of the source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by an output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 11:
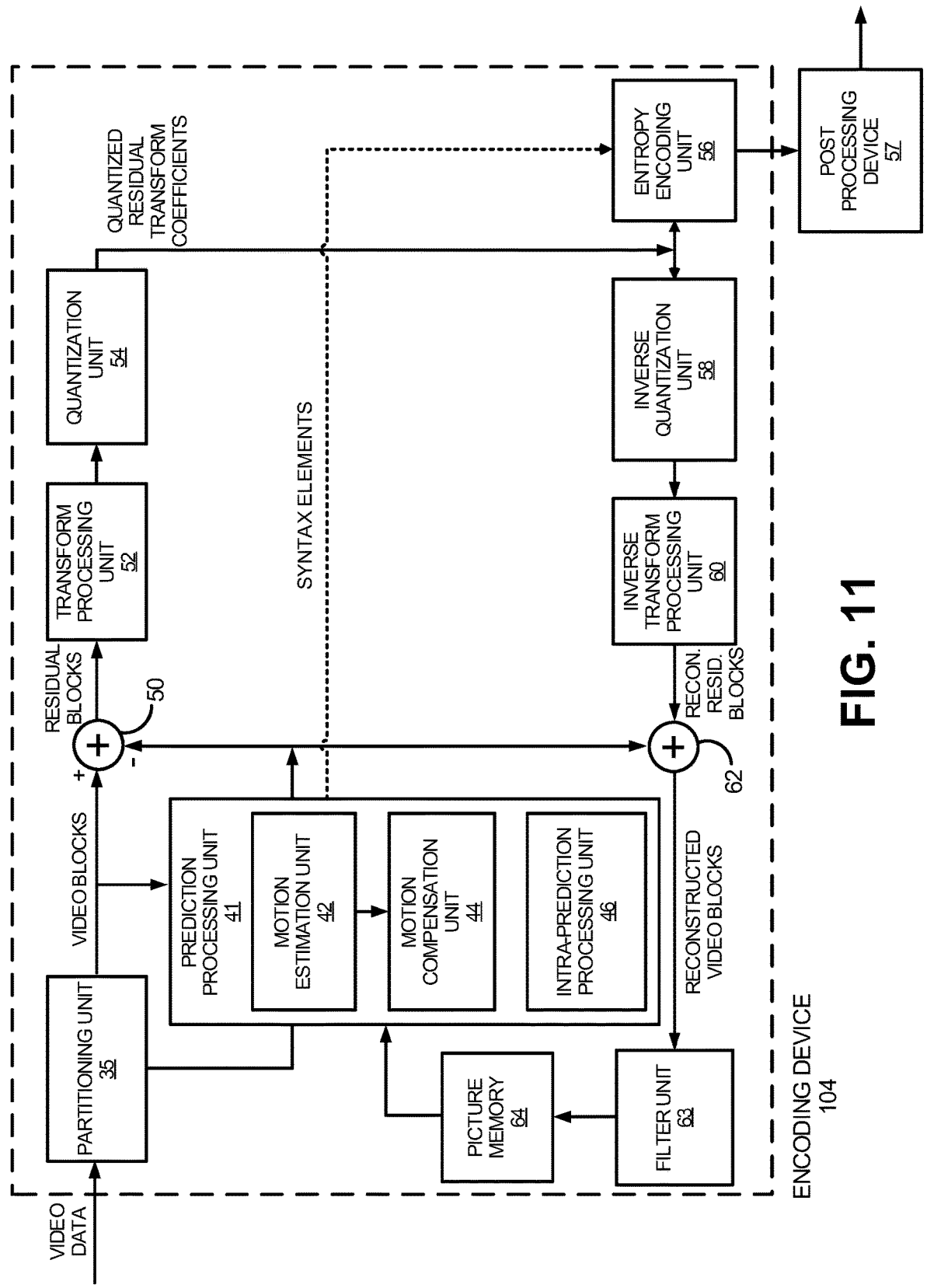
FIG. 11 is a block diagram illustrating an example video encoding device, in accordance with some examples.
Figure 12:
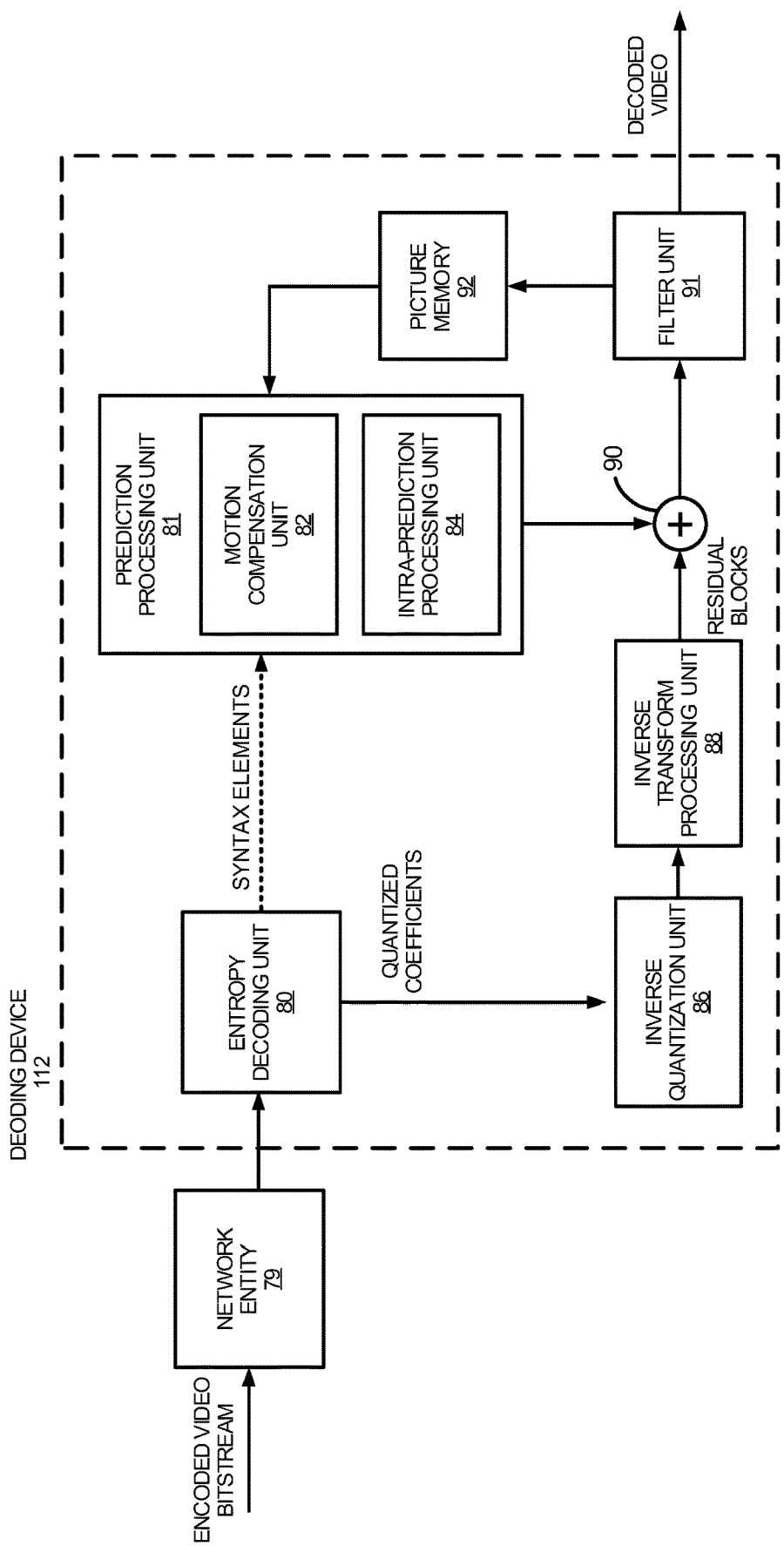
FIG. 12 is a block diagram illustrating an example video decoding device, in accordance with some examples.

Specific details of the encoding device 104 and the decoding device 112 are shown in FIG. 11 and FIG. 12, respectively. FIG. 11 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 11 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 11, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-prediction coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or generalized P and B slices (GPB) slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce a bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of this disclosure have generally been described with respect to the encoding device 104, but as mentioned above, some of the techniques of this disclosure may also be implemented by post processing device 57.

The encoding device 104 of FIG. 11 represents an example of a video encoder configured to perform one or more of the transform coding techniques described herein. The encoding device 104 may perform any of the techniques described herein, including the processes described above with respect to FIG. 8 and FIG. 10.

FIG. 12 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra-prediction processing unit 84. The decoding device 112 may, in some examples, perform a decoding pass generally reciprocal to the encoding pass described with respect to the encoding device 104 from FIG. 11.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in one or more parameter sets, such as a VPS, SPS, and PPS.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 12 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

The decoding device 112 of FIG. 12 represents an example of a video decoder configured to perform one or more of the transform coding techniques described herein. The decoding device 112 may perform any of the techniques described herein, including the processes described above with respect to FIG. 7 and FIG. 9.

In the foregoing description, aspects of the application are described with reference to specific embodiments thereof, but those skilled in the art will recognize that the subject matter of this application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1

A method of decoding video data, including: obtaining an encoded block of the video data; determining at least one of a width of the block and a height of the block; comparing at least one of the width of the block to a first threshold and the height of the block to a second threshold; determining a horizontal transform and a vertical transform to use for the block based on comparing at least one of the width of the block to the first threshold and the height of the block to the second threshold, the horizontal transform and the vertical transform being determined without decoding a syntax element that indicates the horizontal transform and the vertical transform; determining a block of residual data based on the horizontal transform and the vertical transform determined for the block; and decoding, using intra-prediction or inter-prediction, a video block based on the block of residual data and a predictive block.

Example 2

A method of decoding video data, including: obtaining an encoded block of the video data; determining at least one of a width of the block and a height of the block; comparing at least one of the width of the block to a first threshold and the height of the block to a second threshold; where it is determined that the width of the block exceeds the first threshold, determining a horizontal transform corresponding to a first default horizontal transform; where it is determined that the width of the block does not exceed the first threshold, determining a horizontal transform corresponding to a second default horizontal transform; where it is determined that the height of the block exceeds the second threshold, determining a vertical transform corresponding to a first default vertical transform; where it is determined that the height of the block does not exceed the second threshold, determining a vertical transform corresponding to a second default vertical transform; determining a block of residual data based on the horizontal transform and the vertical transform determined for the block; and decoding, using intra-prediction or inter-prediction, a video block based on the block of residual data and a predictive block.

Example 3

A method according to any of Examples 1 or 2, wherein the horizontal transform is determined for the block based on comparing the width of the block to the first threshold.

Example 4

A method according to any of Examples 1 through 3, wherein the vertical transform is determined for the block based on comparing the height of the block to the second threshold.

Example 5

A method according to any of Examples 1 through 4, wherein the horizontal transform is determined for the block based on comparing the width of the block to the first threshold, and wherein the vertical transform is determined for the block based on comparing the height of the block to the second threshold.

Example 6

A method according to any of Examples 1 through 5, wherein the horizontal transform is restricted for a transform unit (TU) of the block based on the width of the block.

Example 7

A method according to any of Examples 1 through 6, wherein the vertical transform is restricted for a transform unit (TU) of the block based on the height of the block.

Example 8

A method according to any of Examples 1 through 7, wherein the block is a transform unit (TU), and wherein the horizontal transform is restricted for the block based on the width of the block.

Example 9

A method according to any of Examples 1 through 8, wherein the block is a transform unit (TU), and wherein the vertical transform is restricted for the block based on the height of the block.

Example 10

A method according to any of Examples 1 through 9, wherein the horizontal transform for the block is determined to be a first type of horizontal transform when the width of the block is less than the first threshold, and wherein the horizontal transform for the block is determined to be a second type of horizontal transform when the width of the block is greater than the first threshold.

Example 11

A method according to any of Examples 1 through 10, wherein the first type of horizontal transform is different than the second type of horizontal transform.

Example 12

A method according to any of Examples 1 through 11, wherein the second type of horizontal transform is a discrete cosine transform (DCT) Type-II transform, and wherein the first type of horizontal transform is a transform that is different than a DCT Type-II transform.

Example 13

A method according to any of Examples 1 through 12, wherein the first type of horizontal transform is one of a discrete sine transform (DST) Type-VII transform or a DCT Type-VIII transform.

Example 14

A method according to any of Examples 1 through 13, wherein the vertical transform for the block is determined to be a first type of vertical transform when the height of the block is less than the second threshold, and wherein the vertical transform for the block is determined to be a second type of vertical transform when the height of the block is greater than the second threshold.

Example 15

A method according to any of Examples 1 through 14, wherein the first type of vertical transform is different than the second type of vertical transform.

Example 16

A method according to any of Examples 1 through 15, wherein the second type of vertical transform is a discrete cosine transform (DCT) Type-II transform, and wherein the first type of vertical transform is a transform that is different than a DCT Type-II transform.

Example 17

A method according to any of Examples 1 through 16, wherein the first type of vertical transform is one of a discrete sine transform (DST) Type-VII transform or a DCT Type-VIII transform.

Example 18

A method according to any of Examples 1 through 17, wherein the block includes a coding unit (CU) or a transform unit (TU).

Example 19

An apparatus for decoding video data comprising a memory configured to store at least one encoded block of the video data, and a video decoder comprising at least one of fixed-function and programmable circuitry, the video decoder being configured to: obtain an encoded block of the video data; determine at least one of a width of the block and a height of the block; compare at least one of the width of the block to a first threshold and the height of the block to a second threshold; determine a horizontal transform and a vertical transform to use for the block based on a comparison of at least one of the width of the block to the first threshold and the height of the block to the second threshold, the horizontal transform and the vertical transform being determined without decoding a syntax element that indicates the horizontal transform and the vertical transform; determine a block of residual data based on the horizontal transform and the vertical transform determined for the block; and decode, using intra-prediction or inter-prediction, a video block based on the block of residual data and a predictive block.

Example 20

An apparatus for decoding video data comprising a memory configured to store at least one encoded block of the video data, and a video decoder comprising at least one of fixed-function and programmable circuitry, the video decoder being configured to: obtain an encoded block of the video data; determine at least one of a width of the block and a height of the block; compare at least one of the width of the block to a first threshold and the height of the block to a second threshold; where it is determined that the width of the block exceeds the first threshold, determine a horizontal transform corresponding to a first default horizontal transform; where it is determined that the width of the block does not exceed the first threshold, determine a horizontal transform corresponding to a second default horizontal transform; where it is determined that the height of the block exceeds the second threshold, determine a vertical transform corresponding to a first default vertical transform; where it is determined that the height of the block does not exceed the second threshold, determine a vertical transform corresponding to a second default vertical transform; determine a block of residual data based on the horizontal transform and the vertical transform determined for the block; and decode, using intra-prediction or inter-prediction, a video block based on the block of residual data and a predictive block.

Example 21

An apparatus according to any of Examples 19 or 20, wherein the horizontal transform is determined for the block based on a comparison of the width of the block to the first threshold.

Example 22

An apparatus according to any of Examples 19 through 21, wherein the vertical transform is determined for the block based on a comparison of the height of the block to the second threshold.

Example 23

An apparatus according to any of Examples 19 through 22, wherein the horizontal transform is determined for the block based on a comparison of the width of the block to the first threshold, and wherein the vertical transform is determined for the block based on a comparison of the height of the block to the second threshold.

Example 24

An apparatus according to any of Examples 19 through 23, wherein the horizontal transform is restricted for a transform unit (TU) of the block based on the width of the block.

Example 25

An apparatus according to any of Examples 19 through 24, wherein the vertical transform is restricted for a transform unit (TU) of the block based on the height of the block.

Example 26

An apparatus according to any of Examples 19 through 25, wherein the block is a transform unit (TU), and wherein the horizontal transform is restricted for the block based on the width of the block.

Example 27

An apparatus according to any of Examples 19 through 26, wherein the block is a transform unit (TU), and wherein the vertical transform is restricted for the block based on the height of the block.

Example 28

An apparatus according to any of Examples 19 through 27, wherein the horizontal transform for the block is determined to be a first type of horizontal transform when the width of the block is less than the first threshold, and wherein the horizontal transform for the block is determined to be a second type of horizontal transform when the width of the block is greater than the first threshold.

Example 29

An apparatus according to any of Examples 19 through 28, wherein the first type of horizontal transform is different than the second type of horizontal transform.

Example 30

An apparatus according to any of Examples 19 through 29, wherein the second type of horizontal transform is a discrete cosine transform (DCT) Type-II transform, and wherein the first type of horizontal transform is a transform that is different than a DCT Type-II transform.

Example 31

An apparatus according to any of Examples 19 through 30, wherein the first type of horizontal transform is one of a discrete sine transform (DST) Type-VII transform or a DCT Type-VIII transform.

Example 32

An apparatus according to any of Examples 19 through 31, wherein the vertical transform for the block is determined to be a first type of vertical transform when the height of the block is less than the second threshold, and wherein the vertical transform for the block is determined to be a second type of vertical transform when the height of the block is greater than the second threshold.

Example 33

An apparatus according to any of Examples 19 through 32, wherein the first type of vertical transform is different than the second type of vertical transform.

Example 34

An apparatus according to any of Examples 19 through 33, wherein the second type of vertical transform is a discrete cosine transform (DCT) Type-II transform, and wherein the first type of vertical transform is a transform that is different than a DCT Type-II transform.

Example 35

An apparatus according to any of Examples 19 through 34, wherein the first type of vertical transform is one of a discrete sine transform (DST) Type-VII transform or a DCT Type-VIII transform.

Example 36

An apparatus according to any of Examples 19 through 35, wherein the block includes a coding unit (CU) or a transform unit (TU).

Example 37

An apparatus according to any of Examples 19 through 36, further comprising a display configured to display the video data.

Example 38

An apparatus according to any of Examples 19 through 37, wherein the apparatus comprises one or more of a camera, a computer, a mobile device, a broadcast receiver device, or a set-top box.

In some implementations, the above-described examples 1-18 and/or 19-38 can be implemented using a computer-readable storage medium storing instructions that when executed cause one or more processors of a device for decoding video data to perform some or all of the various operations. For example, a computer-readable storage medium can be provided storing instructions that when executed cause one or more processors of a device for decoding video data to: obtain an encoded block of the video data; determine at least one of a width of the block and a height of the block; compare at least one of the width of the block to a first threshold and the height of the block to a second threshold; determine a horizontal transform and a vertical transform to use for the block based on comparing at least one of the width of the block to the first threshold and the height of the block to the second threshold, the horizontal transform and the vertical transform being determined without decoding a syntax element that indicates the horizontal transform and the vertical transform; determine a block of residual data based on the horizontal transform and the vertical transform determined for the block; and decode, using intra-prediction or inter-prediction, a video block based on the block of residual data and a predictive block.

In some implementations, the above-described examples 1-18 and/or 19-38 can be implemented using an apparatus comprising one or more means for performing some or all of the various operations. For example, an apparatus for decoding video data can be provided, comprising: means for obtaining an encoded block of the video data; means for determining at least one of a width of the block and a height of the block; means for comparing at least one of the width of the block to a first threshold and the height of the block to a second threshold; means for determining a horizontal transform and a vertical transform to use for the block based on comparing at least one of the width of the block to the first threshold and the height of the block to the second threshold, the horizontal transform and the vertical transform being determined without decoding a syntax element that indicates the horizontal transform and the vertical transform; means for determining a block of residual data based on the horizontal transform and the vertical transform determined for the block; and means for decoding, using intra-prediction or inter-prediction, a video block based on the block of residual data and a predictive block.

Example 39

A method of encoding video data, including: obtaining an encoded block of the video data; determining at least one of a width of the block and a height of the block; comparing at least one of the width of the block to a first threshold and the height of the block to a second threshold; determining a horizontal transform and a vertical transform to use for the block based on comparing at least one of the width of the block to the first threshold and the height of the block to the second threshold; and generating, without a syntax element that indicates the horizontal transform and the vertical transform, an encoded video bitstream.

Example 40

A method of encoding video data, including: obtaining an encoded block of the video data; determining at least one of a width of the block and a height of the block; comparing at least one of the width of the block to a first threshold and the height of the block to a second threshold; where it is determined that the width of the block exceeds the first threshold, determining a horizontal transform corresponding to a first default horizontal transform; where it is determined that the width of the block does not exceed the first threshold, determining a horizontal transform corresponding to a second default horizontal transform; where it is determined that the height of the block exceeds the second threshold, determining a vertical transform corresponding to a first default vertical transform; where it is determined that the height of the block does not exceed the second threshold, determining a vertical transform corresponding to a second default vertical transform; and generating, without a syntax element that indicates the horizontal transform and the vertical transform, an encoded video bitstream.

Example 41

A method according to any of Examples 39 or 40, wherein the horizontal transform is determined for the block based on comparing the width of the block to the first threshold.

Example 42

A method according to any of Examples 39 through 41, wherein the vertical transform is determined for the block based on comparing the height of the block to the second threshold.

Example 43

A method according to any of Examples 39 through 42, wherein the horizontal transform is determined for the block based on comparing the width of the block to the first threshold, and wherein the vertical transform is determined for the block based on comparing the height of the block to the second threshold.

Example 44

A method according to any of Examples 39 through 43, wherein the horizontal transform is restricted for a transform unit (TU) of the block based on the width of the block.

Example 45

A method according to any of Examples 39 through 44, wherein the vertical transform is restricted for a transform unit (TU) of the block based on the height of the block.

Example 46

A method according to any of Examples 39 through 45, wherein the block is a transform unit (TU), and wherein the horizontal transform is restricted for the block based on the width of the block.

Example 47

A method according to any of Examples 39 through 46, wherein the block is a transform unit (TU), and wherein the vertical transform is restricted for the block based on the height of the block.

Example 48

A method according to any of Examples 39 through 47, wherein the horizontal transform for the block is determined to be a first type of horizontal transform when the width of the block is less than the first threshold, and wherein the horizontal transform for the block is determined to be a second type of horizontal transform when the width of the block is greater than the first threshold.

Example 49

A method according to any of Examples 39 through 48, wherein the first type of horizontal transform is different than the second type of horizontal transform.

Example 50

A method according to any of Examples 39 through 49, wherein the second type of horizontal transform is a discrete cosine transform (DCT) Type-II transform, and wherein the first type of horizontal transform is a transform that is different than a DCT Type-II transform.

Example 51

A method according to any of Examples 39 through 50, wherein the first type of horizontal transform is one of a discrete sine transform (DST) Type-VII transform or a DCT Type-VIII transform.

Example 52

A method according to any of Examples 39 through 51, wherein the vertical transform for the block is determined to be a first type of vertical transform when the height of the block is less than the second threshold, and wherein the vertical transform for the block is determined to be a second type of vertical transform when the height of the block is greater than the second threshold.

Example 53

A method according to any of Examples 39 through 52, wherein the first type of vertical transform is different than the second type of vertical transform.

Example 54

A method according to any of Examples 39 through 53, wherein the second type of vertical transform is a discrete cosine transform (DCT) Type-II transform, and wherein the first type of vertical transform is a transform that is different than a DCT Type-II transform.

Example 55

A method according to any of Examples 39 through 54, wherein the first type of vertical transform is one of a discrete sine transform (DST) Type-VII transform or a DCT Type-VIII transform.

Example 56

A method according to any of Examples 39 through 55, wherein the block includes a coding unit (CU) or a transform unit (TU).

Example 57

A method according to any of Examples 39 through 56, further comprising: generating a transform block including one or more transform coefficients based on application of the horizontal transform and the vertical transform to residual data; and encoding the transform block.

Example 58

An apparatus for encoding video data comprising a memory configured to store at least one encoded block of the video data, and a video encoder comprising at least one of fixed-function and programmable circuitry, the video encoder being configured to: obtain an encoded block of the video data; determine at least one of a width of the block and a height of the block; compare at least one of the width of the block to a first threshold and the height of the block to a second threshold; determine a horizontal transform and a vertical transform to use for the block based on a comparison of at least one of the width of the block to the first threshold and the height of the block to the second threshold; and generate, without a syntax element that indicates the horizontal transform and the vertical transform, an encoded video bitstream.

Example 59

An apparatus for encoding video data comprising a memory configured to store at least one encoded block of the video data, and a video encoder comprising at least one of fixed-function and programmable circuitry, the video encoder being configured to: obtain an encoded block of the video data; determine at least one of a width of the block and a height of the block; compare at least one of the width of the block to a first threshold and the height of the block to a second threshold; where it is determined that the width of the block exceeds the first threshold, determine a horizontal transform corresponding to a first default horizontal transform; where it is determined that the width of the block does not exceed the first threshold, determine a horizontal transform corresponding to a second default horizontal transform; where it is determined that the height of the block exceeds the second threshold, determine a vertical transform corresponding to a first default vertical transform; where it is determined that the height of the block does not exceed the second threshold, determine a vertical transform corresponding to a second default vertical transform; and generate, without a syntax element that indicates the horizontal transform and the vertical transform, an encoded video bitstream.

Example 60

An apparatus according to any of Examples 58 or 59, wherein the horizontal transform is determined for the block based on a comparison of the width of the block to the first threshold.

Example 61

An apparatus according to any of Examples 58 through 60, wherein the vertical transform is determined for the block based on a comparison of the height of the block to the second threshold.

Example 62

An apparatus according to any of Examples 58 through 61, wherein the horizontal transform is determined for the block based on a comparison of the width of the block to the first threshold, and wherein the vertical transform is determined for the block based on a comparison of the height of the block to the second threshold.

Example 63

An apparatus according to any of Examples 58 through 62, wherein the horizontal transform is restricted for a transform unit (TU) of the block based on the width of the block.

Example 64

An apparatus according to any of Examples 58 through 63, wherein the vertical transform is restricted for a transform unit (TU) of the block based on the height of the block.

Example 65

An apparatus according to any of Examples 58 through 64, wherein the block is a transform unit (TU), and wherein the horizontal transform is restricted for the block based on the width of the block.

Example 66

An apparatus according to any of Examples 58 through 65, wherein the block is a transform unit (TU), and wherein the vertical transform is restricted for the block based on the height of the block.

Example 67

An apparatus according to any of Examples 58 through 66, wherein the horizontal transform for the block is determined to be a first type of horizontal transform when the width of the block is less than the first threshold, and wherein the horizontal transform for the block is determined to be a second type of horizontal transform when the width of the block is greater than the first threshold.

Example 68

An apparatus according to any of Examples 58 through 67, wherein the first type of horizontal transform is different than the second type of horizontal transform.

Example 69

An apparatus according to any of Examples 58 through 68, wherein the second type of horizontal transform is a discrete cosine transform (DCT) Type-II transform, and wherein the first type of horizontal transform is a transform that is different than a DCT Type-II transform.

Example 70

An apparatus according to any of Examples 58 through 69, wherein the first type of horizontal transform is one of a discrete sine transform (DST) Type-VII transform or a DCT Type-VIII transform.

Example 71

An apparatus according to any of Examples 58 through 70, wherein the vertical transform for the block is determined to be a first type of vertical transform when the height of the block is less than the second threshold, and wherein the vertical transform for the block is determined to be a second type of vertical transform when the height of the block is greater than the second threshold.

Example 72

An apparatus according to any of Examples 58 through 71, wherein the first type of vertical transform is different than the second type of vertical transform.

Example 73

An apparatus according to any of Examples 58 through 72, wherein the second type of vertical transform is a discrete cosine transform (DCT) Type-II transform, and wherein the first type of vertical transform is a transform that is different than a DCT Type-II transform.

Example 74

An apparatus according to any of Examples 58 through 73, wherein the first type of vertical transform is one of a discrete sine transform (DST) Type-VII transform or a DCT Type-VIII transform.

Example 75

An apparatus according to any of Examples 58 through 74, wherein the block includes a coding unit (CU) or a transform unit (TU).

Example 76

An apparatus according to any of Examples 58 through 75, wherein the video encoder is configured to: generate a transform block including one or more transform coefficients based on application of the horizontal transform and the vertical transform to residual data; and encode the transform block.

Example 77

An apparatus according to any of Examples 58 through 76, wherein the apparatus comprises one or more of a camera, a computer, a mobile device, a broadcast receiver device, or a set-top box.

In some implementations, the above-described examples 39-57 and/or 58-77 can be implemented using a computer-readable storage medium storing instructions that when executed cause one or more processors of a device for decoding video data to perform some or all of the various operations. For example, a computer-readable storage medium can be provided storing instructions that when executed cause one or more processors of a device for encoding video data to: obtain an encoded block of the video data; determine at least one of a width of the block and a height of the block; compare at least one of the width of the block to a first threshold and the height of the block to a second threshold; determine a horizontal transform and a vertical transform to use for the block based on comparing at least one of the width of the block to the first threshold and the height of the block to the second threshold; and generate, without a syntax element that indicates the horizontal transform and the vertical transform, an encoded video bitstream.

In some implementations, the above-described examples 39-57 and/or 58-77 can be implemented using an apparatus comprising one or more means for performing some or all of the various operations. For example, an apparatus for encoding video data can be provided, comprising: means for obtaining an encoded block of the video data; means for determining at least one of a width of the block and a height of the block; means for comparing at least one of the width of the block to a first threshold and the height of the block to a second threshold; means for determining a horizontal transform and a vertical transform to use for the block based on comparing at least one of the width of the block to the first threshold and the height of the block to the second threshold; and means for generating, without a syntax element that indicates the horizontal transform and the vertical transform, an encoded video bitstream.

What is claimed is:

1. A method of decoding video data, the method comprising:
   obtaining a block of the video data;
   determining, using intra-prediction or inter-prediction, a predictive block for the block;
   determining at least one of a width of the block and a height of the block;
   comparing at least one of the width of the block to a first threshold and the height of the block to a second threshold;
   determining a horizontal transform and a vertical transform to use for the block based on comparing at least one of the width of the block to the first threshold and the height of the block to the second threshold, the horizontal transform and the vertical transform being determined without decoding a syntax element that indicates the horizontal transform and the vertical transform, comprising:
      determining the horizontal transform for the block to be a first type of horizontal transform based on the comparing indicating that the width of the block is less than the first threshold;
      determining the horizontal transform for the block to be a second type of horizontal transform based on the comparing indicating that the width of the block is greater than the first threshold;
      determining the vertical transform for the block to be a first type of vertical transform based on the comparing indicating that the height of the block is less than the second threshold; and
      determining the vertical transform for the block to be a second type of vertical transform based on the comparing indicating that the height of the block is greater than the second threshold;
   determining a block of residual data based on the horizontal transform and the vertical transform determined for the block; and
   decoding a video block based on the block of residual data and the predictive block.

2. The method of claim 1, wherein the horizontal transform is determined for the block based on comparing the width of the block to the first threshold.

3. The method of claim 1, wherein the vertical transform is determined for the block based on comparing the height of the block to the second threshold.

4. The method of claim 1, wherein the horizontal transform is determined for the block based on comparing the width of the block to the first threshold, and wherein the vertical transform is determined for the block based on comparing the height of the block to the second threshold.

5. The method of claim 1, wherein the block is a transform unit (TU), and wherein the horizontal transform is restricted for the block based on the width of the block.

6. The method of claim 1, wherein the block is a transform unit (TU), and wherein the vertical transform is restricted for the block based on the height of the block.

7. The method of claim 1, wherein the first type of horizontal transform is different than the second type of horizontal transform.

8. The method of claim 1, wherein the second type of horizontal transform is a discrete cosine transform (DCT) Type-II transform, and wherein the first type of horizontal transform is a transform that is different than a DCT Type-II transform.

9. The method of claim 8, wherein the first type of horizontal transform is one of a discrete sine transform (DST) Type-VII transform or a DCT Type-VIII transform.

10. The method of claim 1, wherein the first type of vertical transform is different than the second type of vertical transform.

11. The method of claim 1, wherein the second type of vertical transform is a discrete cosine transform (DCT) Type-II transform, and wherein the first type of vertical transform is a transform that is different than a DCT Type-II transform.

12. The method of claim 11, wherein the first type of vertical transform is one of a discrete sine transform (DST) Type-VII transform or a DCT Type-VIII transform.

13. The method of claim 1, wherein the block includes a coding unit (CU) or a transform unit (TU).

14. The method of claim 1, wherein the first threshold and the second threshold have a same value.

15. An apparatus for decoding video data, comprising:
a memory configured to store at least one encoded block of the video data; and
a video decoder comprising at least one of fixed-function and programmable circuitry, the video decoder being configured to:
obtain a block of the video data;
determine, using intra-prediction or inter-prediction, a predictive block for the block;
determine at least one of a width of the block and a height of the block;
compare at least one of the width of the block to a first threshold and the height of the block to a second threshold;
determine a horizontal transform and a vertical transform to use for the block based on a comparison of at least one of the width of the block to the first threshold and the height of the block to the second threshold, the horizontal transform and the vertical transform being determined without decoding a syntax element that indicates the horizontal transform and the vertical transform, wherein to determine the horizontal transform and the vertical transform to use for the block, the video decoder is further configured to:
determine the horizontal transform for the block to be a first type of horizontal transform based on the comparison indicating that the width of the block is less than the first threshold;
determine the horizontal transform for the block to be a second type of horizontal transform based on the comparison indicating that the width of the block is greater than the first threshold;
determine the vertical transform for the block to be a first type of vertical transform based on the comparison indicating that the height of the block is less than the second threshold; and
determine the vertical transform for the block to be a second type of vertical transform based on the comparison indicating that the height of the block is greater than the second threshold; and
the video decoder being further configured to:
determine a block of residual data based on the horizontal transform and the vertical transform determined for the block; and
decode a video block based on the block of residual data and the predictive block.

16. The apparatus of claim 15, wherein the horizontal transform is determined for the block based on a comparison of the width of the block to the first threshold.

17. The apparatus of claim 15, wherein the vertical transform is determined for the block based on a comparison of the height of the block to the second threshold.

18. The apparatus of claim 15, wherein the horizontal transform is determined for the block based on a comparison of the width of the block to the first threshold, and wherein the vertical transform is determined for the block based on a comparison of the height of the block to the second threshold.

19. The apparatus of claim 15, wherein the block is a transform unit (TU), and wherein the horizontal transform is restricted for the block based on the width of the block.

20. The apparatus of claim 15, wherein the block is a transform unit (TU), and wherein the vertical transform is restricted for the block based on the height of the block.

21. The apparatus of claim 15, wherein the first type of horizontal transform is different than the second type of horizontal transform.

22. The apparatus of claim 15, wherein the second type of horizontal transform is a discrete cosine transform (DCT) Type-II transform, and wherein the first type of horizontal transform is a transform that is different than a DCT Type-II transform.

23. The apparatus of claim 22, wherein the first type of horizontal transform is one of a discrete sine transform (DST) Type-VII transform or a DCT Type-VIII transform.

24. The apparatus of claim 15, wherein the first type of vertical transform is different than the second type of vertical transform.

25. The apparatus of claim 15, wherein the second type of vertical transform is a discrete cosine transform (DCT) Type-II transform, and wherein the first type of vertical transform is a transform that is different than a DCT Type-II transform.

26. The apparatus of claim 25, wherein the first type of vertical transform is one of a discrete sine transform (DST) Type-VII transform or a DCT Type-VIII transform.

27. The apparatus of claim 15, wherein the block includes a coding unit (CU) or a transform unit (TU).

28. The apparatus of claim 15, further comprising a display configured to display the video data.

29. The apparatus of claim 15, wherein the apparatus comprises one or more of a camera, a computer, a mobile device, a broadcast receiver device, or a set-top box.

30. The apparatus of claim 15, wherein the first threshold and the second threshold have a same value.

31. A method of encoding video data, the method comprising:
obtaining a block of video data;
determining at least one of a width of the block and a height of the block;
comparing at least one of the width of the block to a first threshold and the height of the block to a second threshold;
determining a horizontal transform and a vertical transform to use for the block based on comparing at least one of the width of the block to the first threshold and the height of the block to the second threshold, comprising:
determining the horizontal transform for the block to be a first type of horizontal transform based on the comparing indicating that the width of the block is less than the first threshold;
determining the horizontal transform for the block to be a second type of horizontal transform based on the comparing indicating that the width of the block is greater than the first threshold;
determining the vertical transform for the block to be a first type of vertical transform based on the comparing indicating that the height of the block is less than the second threshold;
determining the vertical transform for the block to be a second type of vertical transform based on the comparing indicating that the height of the block is greater than the second threshold; and
generating, without a syntax element that indicates the horizontal transform and the vertical transform, an encoded video bitstream.

32. The method of claim 31, wherein the horizontal transform is determined for the block based on comparing the width of the block to the first threshold.

33. The method of claim 31, wherein the vertical transform is determined for the block based on comparing the height of the block to the second threshold.

34. The method of claim 31, wherein the horizontal transform is determined for the block based on comparing the width of the block to the first threshold, and wherein the vertical transform is determined for the block based on comparing the height of the block to the second threshold.

35. The method of claim 31, wherein the block is a transform unit (TU), and wherein the horizontal transform is restricted for the block based on the width of the block.

36. The method of claim 31, wherein the block is a transform unit (TU), and wherein the vertical transform is restricted for the block based on the height of the block.

37. The method of claim 31, wherein the first type of horizontal transform is different than the second type of horizontal transform.

38. The method of claim 31, wherein the second type of horizontal transform is a discrete cosine transform (DCT) Type-II transform, and wherein the first type of horizontal transform is a transform that is different than a DCT Type-II transform.

39. The method of claim 38, wherein the first type of horizontal transform is one of a discrete sine transform (DST) Type-VII transform or a DCT Type-VIII transform.

40. The method of claim 31, wherein the first type of vertical transform is different than the second type of vertical transform.

41. The method of claim 31, wherein the second type of vertical transform is a discrete cosine transform (DCT) Type-II transform, and wherein the first type of vertical transform is a transform that is different than a DCT Type-II transform.

42. The method of claim 41, wherein the first type of vertical transform is one of a discrete sine transform (DST) Type-VII transform or a DCT Type-VIII transform.

43. The method of claim 31, wherein the block includes a coding unit (CU) or a transform unit (TU).

44. The method of claim 31, further comprising:
generating a transform block including one or more transform coefficients based on application of the horizontal transform and the vertical transform to residual data; and
encoding the transform block.

45. The method of claim 31, wherein the first threshold and the second threshold have a same value.

46. An apparatus for encoding video data, comprising:
a memory configured to store at least one block of the video data; and
a video encoder comprising at least one of fixed-function and programmable circuitry, the video encoder being configured to:
obtain a block of video data;
determine at least one of a width of the block and a height of the block;
compare at least one of the width of the block to a first threshold and the height of the block to a second threshold;
determine a horizontal transform and a vertical transform to use for the block based on a comparison of at least one of the width of the block to the first threshold and the height of the block to the second threshold, wherein to determine the horizontal transform and the vertical transform to use for the block, the video encoder is further configured to:
determine the horizontal transform for the block to be a first type of horizontal transform based on the comparison indicating that the width of the block is less than the first threshold;
determine the horizontal transform for the block to be a second type of horizontal transform based on the comparison indicating that the width of the block is greater than the first threshold;
determine the vertical transform for the block to be a first type of vertical transform based on the comparison indicating that the height of the block is less than the second threshold;
determine the vertical transform for the block to be a second type of vertical transform based on the comparison indicating that the height of the block is greater than the second threshold; and
the video encoder being further configured to:
generate, without a syntax element that indicates the horizontal transform and the vertical transform, an encoded video bitstream.

47. The apparatus of claim 46, wherein the horizontal transform is determined for the block based on a comparison of the width of the block to the first threshold.

48. The apparatus of claim 46, wherein the vertical transform is determined for the block based on a comparison of the height of the block to the second threshold.

49. The apparatus of claim 46, wherein the horizontal transform is determined for the block based on a comparison of the width of the block to the first threshold, and wherein the vertical transform is determined for the block based on a comparison of the height of the block to the second threshold.

50. The apparatus of claim 46, wherein the block is a transform unit (TU), and wherein the horizontal transform is restricted for the block based on the width of the block.

51. The apparatus of claim 46, wherein the block is a transform unit (TU), and wherein the vertical transform is restricted for the block based on the height of the block.

52. The apparatus of claim 46, wherein the first type of horizontal transform is different than the second type of horizontal transform.

53. The apparatus of claim 46, wherein the second type of horizontal transform is a discrete cosine transform (DCT) Type-II transform, and wherein the first type of horizontal transform is a transform that is different than a DCT Type-II transform.

54. The apparatus of claim 53, wherein the first type of horizontal transform is one of a discrete sine transform (DST) Type-VII transform or a DCT Type-VIII transform.

55. The apparatus of claim 46, wherein the first type of vertical transform is different than the second type of vertical transform.

56. The apparatus of claim 46, wherein the second type of vertical transform is a discrete cosine transform (DCT) Type-II transform, and wherein the first type of vertical transform is a transform that is different than a DCT Type-II transform.

57. The apparatus of claim 56, wherein the first type of vertical transform is one of a discrete sine transform (DST) Type-VII transform or a DCT Type-VIII transform.

58. The apparatus of claim 46, wherein the block includes a coding unit (CU) or a transform unit (TU).

59. The apparatus of claim 46, wherein the video encoder is further configured to:
   generate a transform block including one or more transform coefficients based on application of the horizontal transform and the vertical transform to residual data; and
   encode the transform block.

60. The apparatus of claim 46, wherein the apparatus comprises one or more of a camera, a computer, a mobile device, a broadcast receiver device, or a set-top box.

61. The apparatus of claim 46, wherein the first threshold and the second threshold have a same value.

* * * * *